(12) United States Patent
Willison

(10) Patent No.: US 10,192,452 B1
(45) Date of Patent: *Jan. 29, 2019

(54) DETERMINING LANDING LOCATIONS

(71) Applicant: Amazon Technologies, Inc., Seattle, WA (US)

(72) Inventor: Jason Douglas Willison, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/595,591

(22) Filed: May 15, 2017

Related U.S. Application Data

(63) Continuation of application No. 14/739,883, filed on Jun. 15, 2015, now Pat. No. 9,701,408.

(51) Int. Cl.
| | | |
|---|---|---|
| *G08G 5/00* | (2006.01) | |
| *G05D 1/06* | (2006.01) | |
| *G08G 5/02* | (2006.01) | |
| *G06F 17/30* | (2006.01) | |
| *G05D 1/10* | (2006.01) | |
| *G06F 9/06* | (2006.01) | |
| *G01S 13/91* | (2006.01) | |

(52) U.S. Cl.
CPC .......... *G08G 5/0086* (2013.01); *G01S 13/913* (2013.01); *G05D 1/0676* (2013.01); *G05D 1/102* (2013.01); *G06F 17/30041* (2013.01); *G08G 5/025* (2013.01); *G06F 9/06* (2013.01)

(58) Field of Classification Search
None
See application file for complete search history.

(56) References Cited

U.S. PATENT DOCUMENTS

| | | |
|---|---|---|
| 2013/0282208 A1 | 10/2013 | Mendez-Rodriguez et al. |
| 2015/0120094 A1 | 4/2015 | Kimchi et al. |
| 2015/0248640 A1 | 9/2015 | Srinivasan |
| 2016/0068264 A1 | 3/2016 | Ganesh et al. |
| 2016/0114905 A1 | 4/2016 | Derenick et al. |
| 2016/0189097 A1 | 6/2016 | Padmaraagam et al. |
| 2016/0307447 A1 | 10/2016 | Johnson et al. |

OTHER PUBLICATIONS

U.S. Appl. No. 14/739,927, filed Jun. 15, 2015, Titled: Instructing Unmanned Aerial Vehicles to Land.
U.S. Appl. No. 14/739,883, "Non-Final Office Action", dated Nov. 4, 2016, 26 pages.
U.S. Appl. No. 14/739,883, "Notice of Allowance", dated Mar. 14, 2017, 17 pages.
U.S. Appl. No. 14/739,883, filed Jun. 15, 2015, Titled: Determining Landing Locations.

*Primary Examiner* — Mussa A Shaawat
*Assistant Examiner* — Abdhesh K Jha
(74) *Attorney, Agent, or Firm* — Kilpatrick Townsend & Stockton LLP

(57) ABSTRACT

In some examples, a landing location within a region for an aerial vehicle may be determined. The landing location may be determined by comparing a first digital elevation dataset and a second digital elevation dataset to identify open areas within the region. Information about the landing location can be shared with the aerial vehicle.

19 Claims, 15 Drawing Sheets

DETERMINING LANDING LOCATIONS

CROSS-REFERENCE TO RELATED APPLICATIONS

This application is a continuation of U.S. patent application Ser. No. 14/739,883 filed Jun. 15, 2015, entitled "DETERMINING LANDING LOCATIONS", which is related to U.S. patent application Ser. No. 14/739,927 filed Jun. 15, 2015, entitled "INSTRUCTING UNMANNED AERIAL VEHICLES TO LAND", the full disclosures of which are incorporated herein by reference for all purposes.

BACKGROUND

A delivery service may deliver items to its customers using one of a variety of different means. For example, an item ordered by a customer from an electronic marketplace may be removed from a shelf in a warehouse by a human picker, loaded into a semi-truck, transferred to a delivery van, and delivered to the customer's doorstep by a delivery person. In some cases, the item may also be transported using a plane, a train, a motorcycle, a bicycle or any combination of the foregoing.

BRIEF DESCRIPTION OF THE DRAWINGS

Various embodiments in accordance with the present disclosure will be described with reference to the drawings, in which.

DETAILED DESCRIPTION

Figure 1:
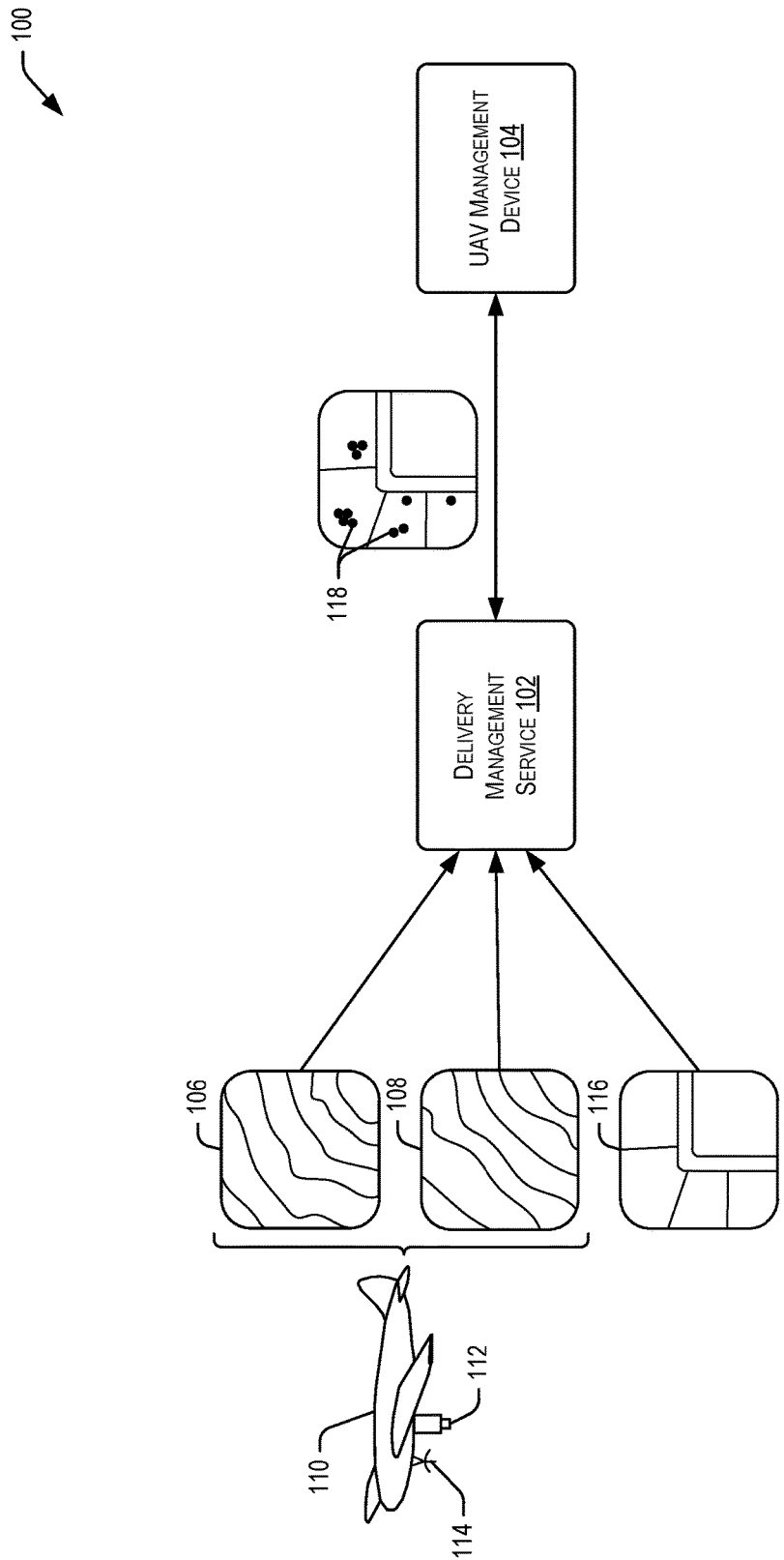
FIG. 1 is an example environment for implementing techniques relating to determining landing locations for unmanned aerial vehicles as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present description are directed to, among other things, techniques relating to determining landing locations for unmanned aerial vehicles. In particular, techniques described herein relate to determining landing locations for unmanned aerial vehicles within a geographic region using two or more disparately collected digital elevation datasets corresponding to the geographic region and parcel data corresponding to the geographic region. Each of the landing locations may be determined in a manner that considers openness of the landing location, area of the landing location, and slope of the landing location. The openness of the landing location may correspond to the landing location having open air (i.e., unobstructed airspace) directly above the landing location (i.e., no obstacles such as trees, power lines, bridges, homes, or any other obstacles located above the landing location). The area of the landing location may correspond to the landing location having an adequate amount of ground—represented as an area value (e.g., m^2)—on which to land the unmanned aerial vehicle. Finally, the slope of the landing location may correspond to the slope of the ground of the landing location not being too steep. By determining landing locations in this manner, it can be assured that the unmanned aerial vehicles will be able to land safely and efficiently.

Turning now to a first particular example, in this example, a digital elevation model (DEM) of a residential neighborhood is collected using a passive collection device. A second digital surface model (DSM) of the residential neighborhood is collected using an active collection device. The DEM and DSM are then made accessible to a delivery management service. The delivery management service also accesses parcel data for the residential neighborhood. The parcel data may define individual parcels that indicate land ownership and zoning information. Using the DEM and the DSM, the delivery management service may identify areas within the residential neighborhood that are open to the sky, i.e., are free of obstacles. The open areas may be compared to the parcel data to identify incidences of the open areas within residential parcels. A slope operation may be performed on the open areas within the residential parcels to identify open areas that are not too steep (e.g., less than 10% slope) for an unmanned aerial vehicle to land on. An area operation may be performed on the open areas within the residential parcels to identify open areas that are large enough (e.g., around 6 meters by 6 meters) for the unmanned aerial vehicle to land. Overlapping areas between the open areas that are not too steep and the open areas that are large enough may be identified as landing areas for the unmanned aerial vehicle. The landing areas may be converted to point format to determine the number and distribution of landing locations within the landing areas. Data representing the landing locations may be saved in a database for use by the unmanned aerial vehicle.

Turning now to a second particular example, in this example, the data representing the landing locations is used to deliver a parcel to a customer of an electronic marketplace. In this example, a delivery management service associated with the electronic marketplace may receive an order from the customer for an item. As part of processing the order, the delivery management service may identify a residential address for the customer. The delivery management service may access a database that includes the data representing the landing locations and, based on the customer's residential address, the delivery management service may identify a particular landing location for delivering the item to the customer. The particular landing location may be located on a residential parcel (e.g., back yard) associated with the customer's residential address. Once the landing location has been identified, the delivery management service may instruct the unmanned aerial vehicle to navigate to the particular landing location and delivery the parcel, including the item, to the customer at the particular landing location.

Turning now to the figures, FIG. 1 illustrates an example block diagram depicting environment 100 for implementing techniques relating to determining landing locations for unmanned aerial vehicles, as described herein. In particular, the environment 100 may include a delivery management service 102 in communication with an unmanned aerial vehicle (UAV) management device 104. The UAV management device 104 may mange the operation of a UAV (not shown). In accordance with techniques described herein, the delivery management service 102 may access a digital surface elevation dataset 106 and a digital bare-earth elevation dataset 108. A digital surface model (DSM) is an example of the digital surface elevation dataset 106. Thus, the digital surface elevation dataset 106 may be a digital model of elevation that includes the elevations of objects located on the surface of the earth (e.g., trees, buildings, bridges, and any other object located on the surface of the earth). A digital elevation model (DEM) is an example of the digital bare-earth elevation dataset 108. Thus, the digital bare-earth elevation dataset 108 may be a digital model of elevation that attempts to represent only the elevation of the bare earth without including the elevations of objects.

Besides the digital surface elevation dataset 106 and the digital bare-earth elevation dataset 108 being distinct based on their definitions discussed above, the digital surface elevation dataset 106 and the digital bare-earth elevation dataset 108 may also be distinct because the collection procedure used for each is distinct. It may be desirable that the digital surface elevation dataset 106 and the digital bare-earth elevation dataset 108 be captured using different collection procedures to ensure high confidence that elevations associated with each are accurate. For example, two different collection procedures may use two different collection devices having two different sensors. If the two different sensors both identify areas on the ground that are coincidentally similar in elevation, as evidenced in the digital surface elevation dataset 106 and the digital bare-earth elevation dataset 108, elevations of the identified areas may be reliable. This may be because the elevations are more accurate than if determined from a single digital elevation dataset or from two digital elevation datasets collected using the same collection device and sensor. It may be desirable that the digital surface elevation dataset 106 and the digital bare-earth elevation dataset 108 be collected within a certain time period. In this manner, the datasets 106, 108 may be temporally related. This may be desirable because the greater the time between when the datasets 106, 108 are collected the greater probability that the ground represented by either of the datasets 106, 108 will be adjusted (e.g., a hole may be dug in an open area) or objects represented by the digital surface elevation dataset 106 will be added, removed, or moved (e.g., structure being built, a tree being cut down, or an object being moved). This may result in imprecise results outputted by the delivery management service 102.

The digital surface elevation dataset 106 and the digital bare-earth elevation dataset 108 may be collected via one or more flights of an airplane 110 or one or more flights of different airplanes. While the airplane 110 is illustrated in FIG. 1, it is understood that any suitable flying device (e.g., helicopters, unmanned aerial vehicles, satellites, and any other suitable flying device) may be used to collect the digital surface elevation dataset 106 and the digital bare-earth elevation dataset 108. The airplane 110 may include one or more collection devices. In this example, the airplane includes a first collection device 112 and a second collection device 114. Each of the first collection device 112 and the second collection device 114 may have its own sensor. In some examples, the airplane 110 includes a single collection device and other airplanes include other collection devices. Examples of the first collection device 112 and the second collection device 114 include Light Detection And Ranging (LiDAR) devices, stereo photogrammetry devices, multi-view stereo photogrammetry devices, Radio Detection And Ranging (RADAR) devices, Doppler RADAR devices, Synthetic Aperture Radar (SAR) devices, and any other suitable device configured to collect and/or determine elevation data.

The digital surface elevation dataset 106 and the digital bare-earth elevation dataset 108 may be distinct from each because each was captured with a distinct collection device, each was collected from a different elevation above the ground, each was collected by a different operator, the data of each was processed using different software, each was collected as part of a different flight path, each was collected on different flights, each was collected under different weather conditions, each was collected on the same flight with different collection devices, and any other condition that may make the digital surface elevation dataset 106 and the digital bare-earth elevation dataset 108 distinct from each other.

In addition to accessing the digital surface elevation dataset 106 and the digital bare-earth elevation dataset 108, the delivery management service 102 may access parcel data 116. The parcel data 116 may be any suitable parcel data provided by any suitable entity. The parcel data 116 may include data describing geographic and legal boundaries of real property. For example, the parcel data 116 may include data that is descriptive of legal descriptions of land parcels, rights of way, easements, and other types of ownership in land. Thus, the parcel data 116 may be represented graphically and may include one or more data fields that describe aspects of the parcels (e.g., zoning, parcel number, present use, property name, jurisdiction, taxpayer name, address, appraised value, lot area, levy code, property reports, latitude and longitude, school district designators, school designators, water and sewer districts, political boundaries, planning and critical designators (e.g., hazards, flood plain information service areas, and other planning and critical designators, and any other suitable aspect)). The parcel data 116 may include private parcels (e.g., residential and commercial) and public parcels (e.g., roads, parks, schools, and other public pieces of land). In some examples, a government entity may generate and maintain the parcel data 116. For example, a county recorder may maintain the parcel data 116 and make it available to members of the public. In some examples, the parcel data 116 may be privately generated. Additionally, while embodiments disclosed herein relate to parcels or patches of "land," as used herein, the term "land" shall be construed to include parcels and patches of area at, above, or below sea level that may be covered by earth, water, air, or items constructed by man.

The delivery management service 102 may be configured to determine one or more landing locations 118. In some examples, the landing locations 118 may be areas within parcels of the parcel data 116 that are suitable for landing an unmanned aerial vehicle. To this end, the landing locations 118 may be determined in a manner that considers openness of the landing locations 118, area of land corresponding to each of the landing locations 118, and slope of the land corresponding to each of the landing locations 118. Each of the landing locations 118 may have coordinates in one or more geographic coordinate systems (e.g., latitude and longitude, Universal Transverse Mercator (UTM), Universal Polar Stereographic (UPS), Cartesian, or any other suitable geographic coordinate system), which may be relative or absolute. The landing locations 118 may be made accessible to the UAV management device 104. Based at least in part on the landing locations 118, the UAV management device 104 may navigate an unmanned aerial vehicle to the landing locations 118 to perform one or more operations (e.g., delivery a parcel to a customer associated with the parcel on which a particular landing location is positioned). Thus, in some examples, the landing locations 118 may be locations where deliveries are made.

Figure 2:
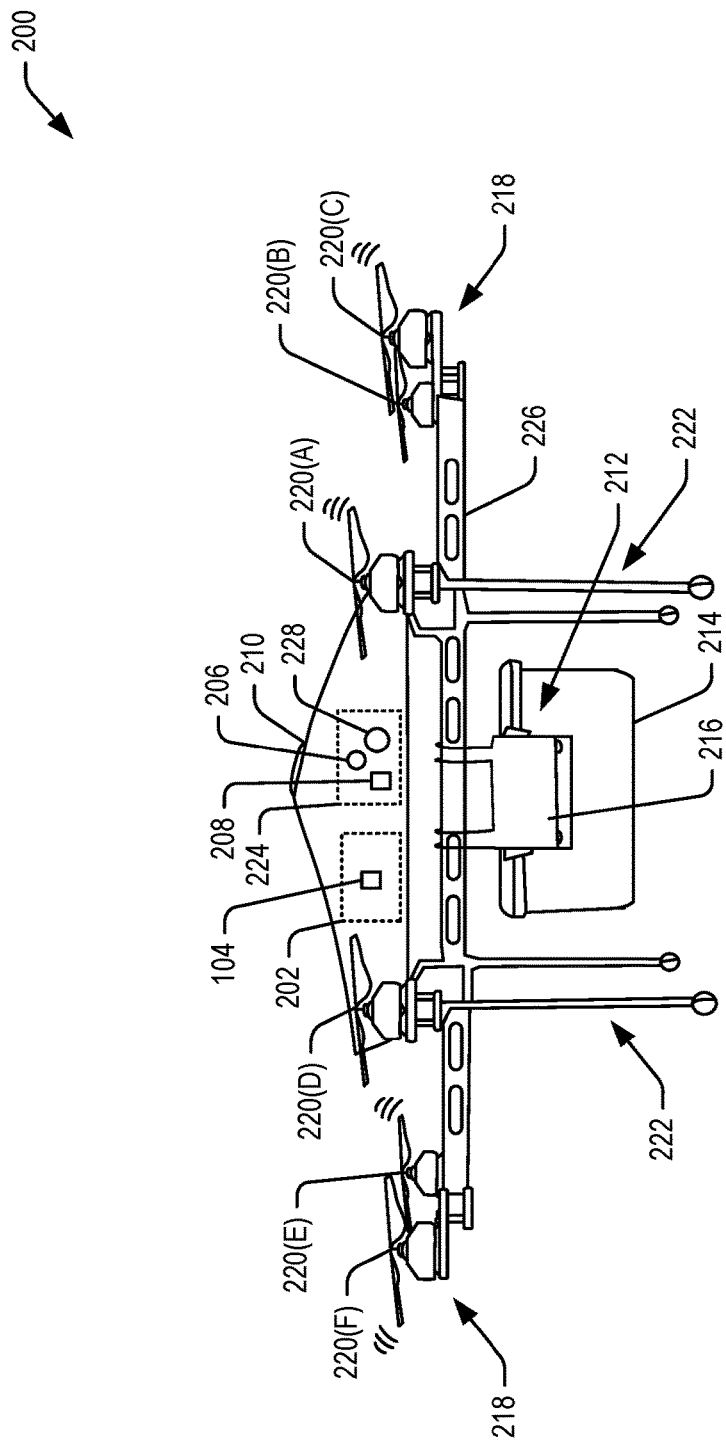
FIG. 2 is an example device for implementing techniques relating to determining landing locations for unmanned aerial vehicles as described herein, according to at least one example.

FIG. 2 illustrates an example UAV 200 for implementing techniques relating to determining landing locations for unmanned aerial vehicles as described herein, according to at least one example. The UAV 200 may be designed in accordance with commercial aviation standards and may include multiple redundancies to ensure reliability. For purposes of this specification, the UAV 200 may include a plurality of systems or subsystems operating under the control of, or at least partly under the control of, a management system 202. The management system 202 may include the UAV management device 104 (e.g., an onboard computer) for autonomously or semi-autonomously controlling and managing the UAV 200 and, in some examples, for enabling remote control by a pilot. The UAV management device 104 will be discussed in more detail with reference to FIG. 3. Portions of the management system 202, including the UAV management device 104, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), radio-frequency identification (RFID) capability (not shown), and interfaces capable of speech interpretation and recognition (not shown).

The UAV 200 may also include a communication system 224 housed within the top cover 210. The communication system 224 may include one or more light sensors 228 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 206 (e.g., microphone, noise filters, and other sensors for capturing sound), and one or more output devices 208 (e.g., microphone, speaker, laser projector, light projector, and other devices for outputting communication information). The management system 202 may be configured to receive information and provide information via components of the communication system 224. For example, the UAV 200 may support two-way communication with users. Two-way communication may be beneficial for verifying users' identities that interact with the UAV 200, for posing questions to users, and for providing instructions to users. In some examples, the communication system 224 may operate semi-autonomously or autonomously.

As shown in FIG. 2, the UAV 200 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. The UAV management device 104 may be configured to control at least a portion of the retaining system 212. In some examples, the retaining system 212 may be configured to release the payload 214 in one of a variety of ways. For example, the retaining system 212 (or other system of the UAV 200) may be configured to release the payload 214 with a winch and spool system, by the retaining system 212 releasing the payload, and other methods of releasing the payload. In some examples, the retaining system 212 may operate semi-autonomously or autonomously.

In FIG. 2, the payload 214 is illustrated as a delivery box. In some examples, the delivery box may include one or more packages or items intended for delivery to a recipient using the techniques described herein. The payload 214, whether as a delivery box or otherwise, may be configured for delivery using a variety of different methods. For example, the payload 214 may include a parachute that opens and slows the payload's 214 descent as it falls to its delivery location. In some examples, the payload 214 may include padding surrounding its package to reduce the impact of a drop from the UAV 200 above the ground. The UAV 200 may also deliver the payload 214 by fully landing on the ground and releasing the retaining system 212.

Further, the UAV 200 may a include propulsion system 218. In some examples, the propulsion system 218 may include rotary blades or otherwise be a propeller-based system. As illustrated in FIG. 2, the propulsion system 218 may include a plurality of propulsion devices, a few of which, 220(A)-220(F), are shown in this view. Each propulsion device may include one or more propellers, a motor, wiring, a balance system, a control mechanism, and other features to enable flight. In some examples, the propulsion system 218 may operate at least partially under the control of the UAV management device 104. In some examples, the propulsion system 218 may be configured to adjust itself without receiving instructions from the UAV management device 104. Thus, the propulsion system 218 may operate semi-autonomously or autonomously. The propulsion system 218 may enable multi-directional flight of the UAV 200 (e.g., by adjusting each propulsion device individually).

The UAV 200 may also include landing structure 222. The landing structure 222 may be adequately rigid to support the UAV 200 and the payload 214. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving, via different connections, the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

Figure 3:
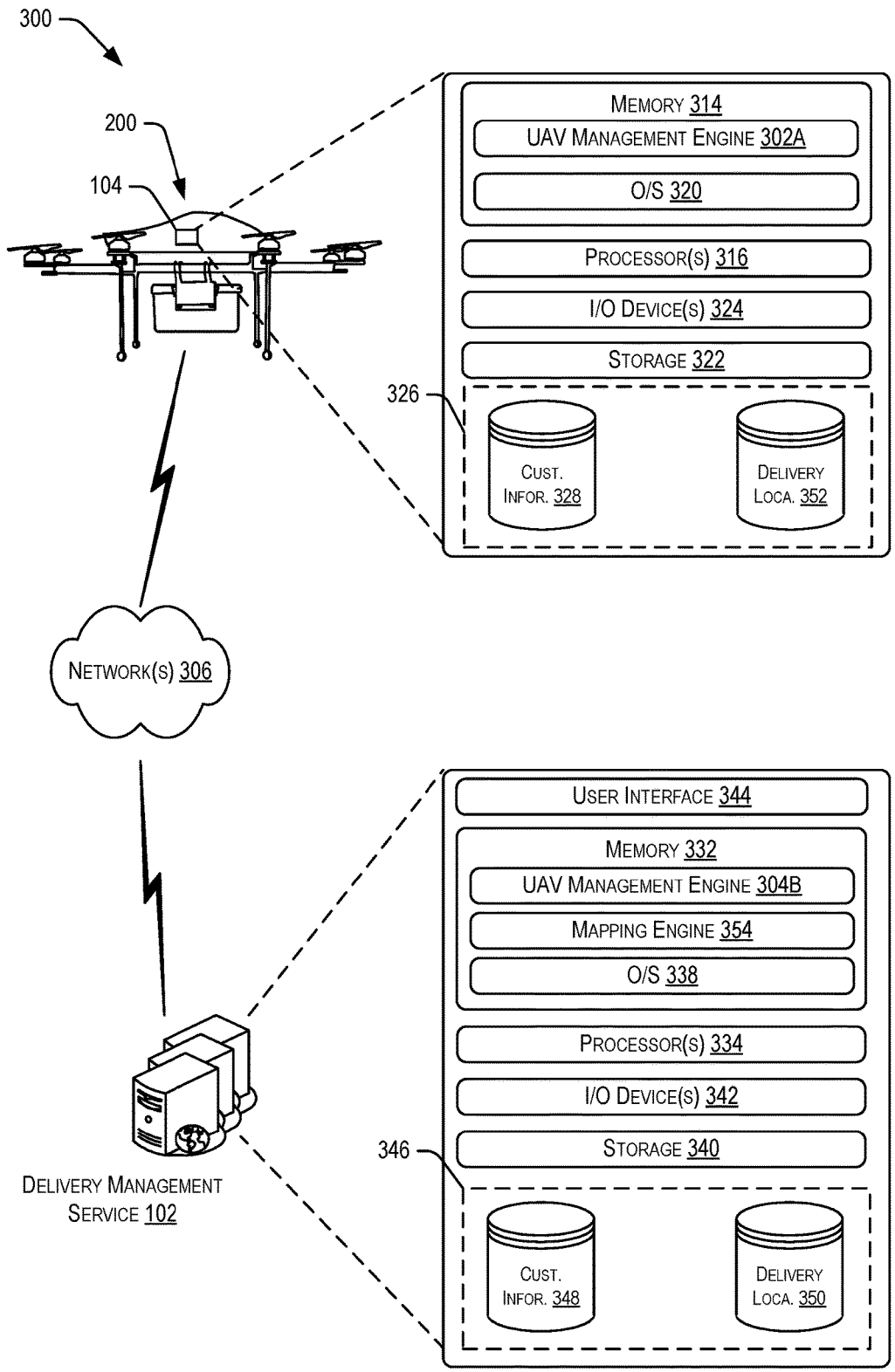
FIG. 3 is an example schematic architecture and devices for implementing techniques relating to determining landing locations for unmanned aerial vehicles as described herein, according to at least one example.

FIG. 3 illustrates an example schematic architecture 300 for implementing techniques relating to determining landing locations for unmanned aerial vehicles as described herein, according to at least one example. The architecture 300 may include the delivery management service 102. The delivery management service 102 may be included as part of an electronic marketplace (not shown) and interface with purchase and delivery services of the electronic marketplace. In this manner, the delivery management service 102 may coordinate delivery of items via UAVs, such as the UAV 200, to customers of the electronic marketplace. In some examples, the delivery management service 102 may determine one or more landing locations for landing UAVs.

In some examples, the delivery management service 102 may be a stand-alone service operated on its own. In either example, the delivery management service 102 may be in communication with the UAV 200 via one or more network(s) 306 (hereinafter, "the network 306"). The network 306 may include any one or a combination of many different types of networks, such as cable networks, the Internet, wireless networks, cellular networks, radio networks, and other private and/or public networks. Thus, the delivery management service 102 may be configured to provide back-end control of the UAV 200 prior to, during, and after completion of its flight plan. As discussed previously, in some examples, the UAV 200 may be configured to accomplish its flight plan (e.g., deliver its payload) with little to no communication with the delivery management service 102.

Turning now to the details of the UAV 200, the UAV 200 may include the UAV management device 104 including at least one memory 314 and one or more processing units (or processor(s)) 316. The processor(s) 316 may be implemented as appropriate in hardware, computer-executable instructions, software, firmware, or combinations thereof. Computer-executable instruction, software, or firmware implementations of the processor(s) 316 may include computer-executable or machine-executable instructions written in any suitable programming language to perform the various functions described. The memory 314 may include more than one memory and may be distributed throughout the UAV management device 104 and/or the delivery management service 102. The memory 314 may store program instructions (e.g., UAV management engine 302A) that are loadable and executable on the processor(s) 316, as well as data generated during the execution of these programs. Depending on the configuration and type of memory including the UAV management engine 302A, the memory 314 may be volatile (such as random access memory (RAM)) and/or non-volatile (such as read-only memory (ROM), flash memory, or other memory). The UAV management device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. The memory 314 may include an operating system 320 and one or more application programs, modules or services for implementing the features disclosed herein including at least the UAV management engine 302A.

In some examples, the UAV management device 104 may also include additional storage 322, which may include removable storage and/or non-removable storage. The additional storage 322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 314 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the UAV management engine 302A. The modules of the UAV management engine 302A may include one or more components, modules, and the like. The UAV management device 104 may also include input/output (I/O) device(s) and/or ports 324, such as for enabling connection with a keyboard, a mouse, a pen, a voice input device, a touch input device, a display, speakers, a printer, or other I/O device. The I/O device(s) 324 may enable communication with the other systems of the UAV 200 (e.g., other parts of the management system, power system, communication system, navigation system, propulsion system, and the retaining system).

The UAV management device 104 may also include a data store 326. The data store 326 may include one or more databases, data structures, or the like for storing and/or retaining information associated with implementation of the techniques described herein. In some examples, the data store 326 may include databases, such as a customer information database 328 and a delivery location information database 352. The customer information database 328 may be used to retain information pertaining to customers of an electronic marketplace associated with the delivery management service 102. Such information may include, for example, delivery address information, customer account information (e.g., electronic profiles for individual users), demographic information for customers, payment instrument information for customers (e.g., credit card, debit cards, bank account information, and other similar payment processing instruments), account preferences for customers, shipping preferences for customers, purchase history of customers, and other similar information pertaining to a particular customer and sets of customers, of the electronic marketplace. In some examples, the customer information database 328 may include any suitable customer information that may be used by the UAV 200 in implementing and/or affecting its flight plan.

The delivery location information database 352 may be used to retain information pertaining to deliver locations determined in accordance with techniques described herein.

Such information may be at least partially generated by the delivery management service 104. In some examples, the information in the delivery location information database 352 may be in a suitable format from which the UAV 200 may determine a flight plan including one or more waypoints. The waypoints may correspond to one or more delivery locations retained in the delivery location information database 352. In some examples, a flight plan of the UAV 200 may include more than one way point (e.g., more than one delivery location) between where the UAV 200 commences its flight plan and where the UAV 200 ends its flight plan.

The delivery management service 102 may include one or more service provider computers, perhaps arranged in a cluster of servers or as a server farm, and may host web service applications. The delivery management service 102 may include at least one memory 332 and one or more processing units (or processor(s)) 334. The processor(s) 334 may be implemented as appropriate in hardware, computer-executable instructions, software, firmware, or combinations thereof. Computer-executable instructions, software or firmware implementations of the processor(s) 334 may include computer-executable or machine-executable instructions written in any suitable programming language to perform the various functions described. The memory 332 may include more than one memory and may be distributed throughout the delivery management service 102. The memory 332 may store program instructions (e.g., the UAV management engine 304B and a mapping engine 354) that are loadable and executable on the processor(s) 334, as well as data generated during the execution of these programs. The memory 332 may be volatile (such as random access memory (RAM)) and/or non-volatile (such as read-only memory (ROM), flash memory, or other memory).

The delivery management service 102 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM. The memory 332 may also include an operating system 338 and one or more application programs, modules or services for implementing the techniques described herein including at least the UAV management engine 304B and the mapping engine 354. The UAV management engine 304B, in some examples, may function similar to the UAV management engine 304A. For example, when the UAV 200 is in network communication with the delivery management service 102, the UAV 200 may receive at least some instructions from the delivery management service 102 as the UAV management engine 304B is executed by the processors 334. In some examples, the UAV 200 executes the UAV management engine 304A independent of the delivery management service 102.

In some examples, the delivery management service 102 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the delivery management service 102. The delivery management service 102 may also include input/output (I/O) device(s) and/or ports 342, such as for enabling connection with a keyboard, a mouse, a pen, a voice input device, a touch input device, a display, speakers, a printer, or other I/O device.

In some examples, the delivery management service 102 may include a user interface 344. The user interface 344 may be utilized by an operator, or other authorized user to access portions of the delivery management service 102. In some examples, the user interface 344 may include a graphical user interface, web-based applications, programmatic interfaces such as application programming interfaces (APIs), or other user interface configurations. The delivery management service 102 may also include data store 346. The data store 346 may include one or more databases, data structures, or the like for storing and/or retaining information associated with the delivery management service 102. The data store 346 may include databases, such as customer information database 348 and delivery location information database 350. The customer information database 348 and the delivery location information database 350 may include similar information as the customer information database 328 and the delivery location information database 352. In some examples, the delivery management service 102 may store a larger amount of information in the data store 346 than the UAV management device 104 is capable of storing in the data store 326. Thus, in some examples, at least a portion of the information from the databases in the data store 346 is copied to the databases of the data store 326, e.g., periodically, occasionally, in connection with an event, or otherwise. In this manner, the data store 326 may have up-to-date information, without having to maintain the databases. In some examples, this information may be transferred as part of a flight plan prior to the UAV 304 beginning the flight plan.

Figure 4:
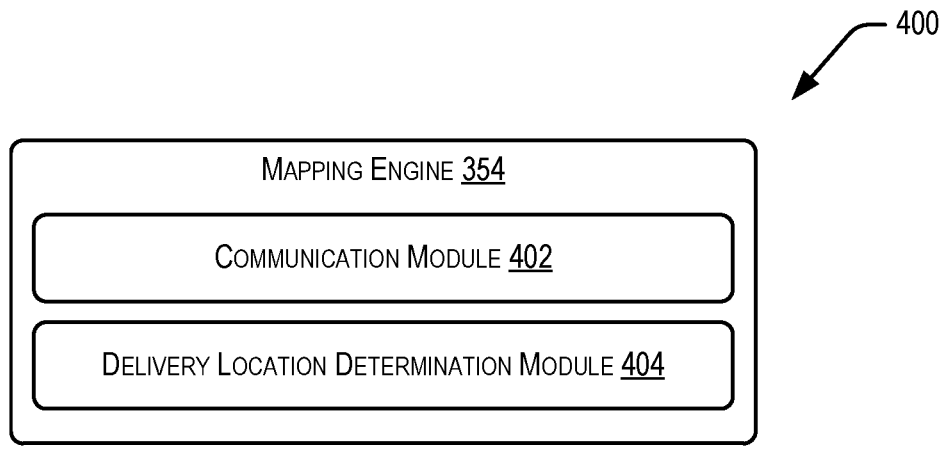
FIG. 4 is an example device for implementing techniques relating to determining landing locations for unmanned aerial vehicles as described herein, according to at least one example.

FIG. 4 illustrates an example device 400 including the mapping engine 354. The mapping engine 354 may be configured to manage one or more sub-modules, components, and/or services directed to examples disclosed herein. In some examples, the mapping engine 354 may include a communication module 402 and a delivery location determination module 404. While these modules are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein. Other modules, components, or engines may perform the same tasks as the mapping engine 354 or other tasks. Each module, component, or engine may be implemented in a similar or different fashion.

The communication module 402 may be configured to access, receive, or request mapping information (e.g., digital elevation datasets, parcel data, and any other suitable mapping information used to implement the techniques described herein). The delivery location determination module 404 may be configured to determine one or more delivery locations based at least in part on the mapping information. In some examples, the delivery location determination module 404 determines the one or more delivery locations on the fly or pre-computes the delivery locations and makes them accessible to other engines described herein. The delivery location determination module 404 may also be configured to make data describing the delivery locations available to the UAV 200.

Figure 5:
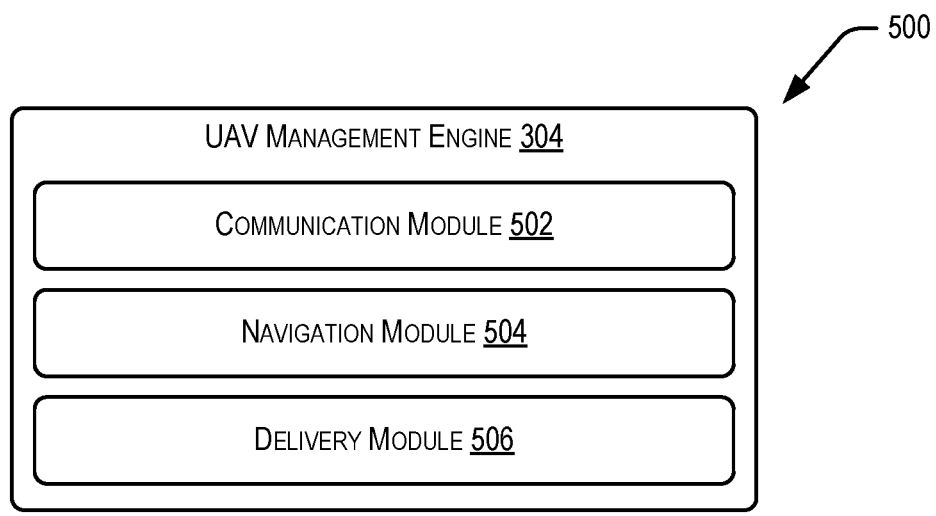
FIG. 5 is an example device for implementing techniques relating to determining landing locations for unmanned aerial vehicles as described herein, according to at least one example.

FIG. 5 illustrates an example device 500 including the UAV management engine 304. The UAV management engine 304 may be configured to manage one or more sub-modules, components, and/or services directed to examples disclosed herein. In some examples, the UAV management engine 304 may include a communication module 502, a navigation module 504, and a delivery module 506. While these modules are illustrated in FIG. 5 and will be described as performing discrete tasks with reference to the flow charts, it is understood that FIG. 5 illustrates example configurations and other configurations performing other tasks and/or similar tasks as those described herein may be implemented according to the techniques described herein. Other modules, components, or engines may perform the same tasks as the UAV management engine 304 or other tasks, they each may be implemented in a similar or different fashion.

The communication engine 502 may be configured to process orders. In some examples, the communication module 502 may be configured to communicate with an electronic marketplace that receives orders from customers for items associated with the electronic marketplace. In some examples, the orders may be orders placed by customers for delivery of items not associated with the electronic marketplace. For example, a customer may order (i.e., request) delivery of an item purchased via a brick and mortar store, a personal item that the customer desires to transfer to another person, an item purchased via a third-party electronic marketplace, or any other suitable reason that an item may be delivered via a UAV. In some examples, the order for delivery may be instituted via an email, phone call, a third-party, or by any other suitable method. The navigation module 504 may be configured to determine a flight plan for navigation. In some examples, the navigation module 504 may also determine delivery locations for delivering items associated with the orders received from the customers and for other orders for delivery. The delivery locations may be associated with one or more flight plans. Determining a delivery location may include determining a delivery location based on an address associated with a customer. The delivery module 506 may be configured to execute delivery of a parcel including the item to the customer.

Figure 6:
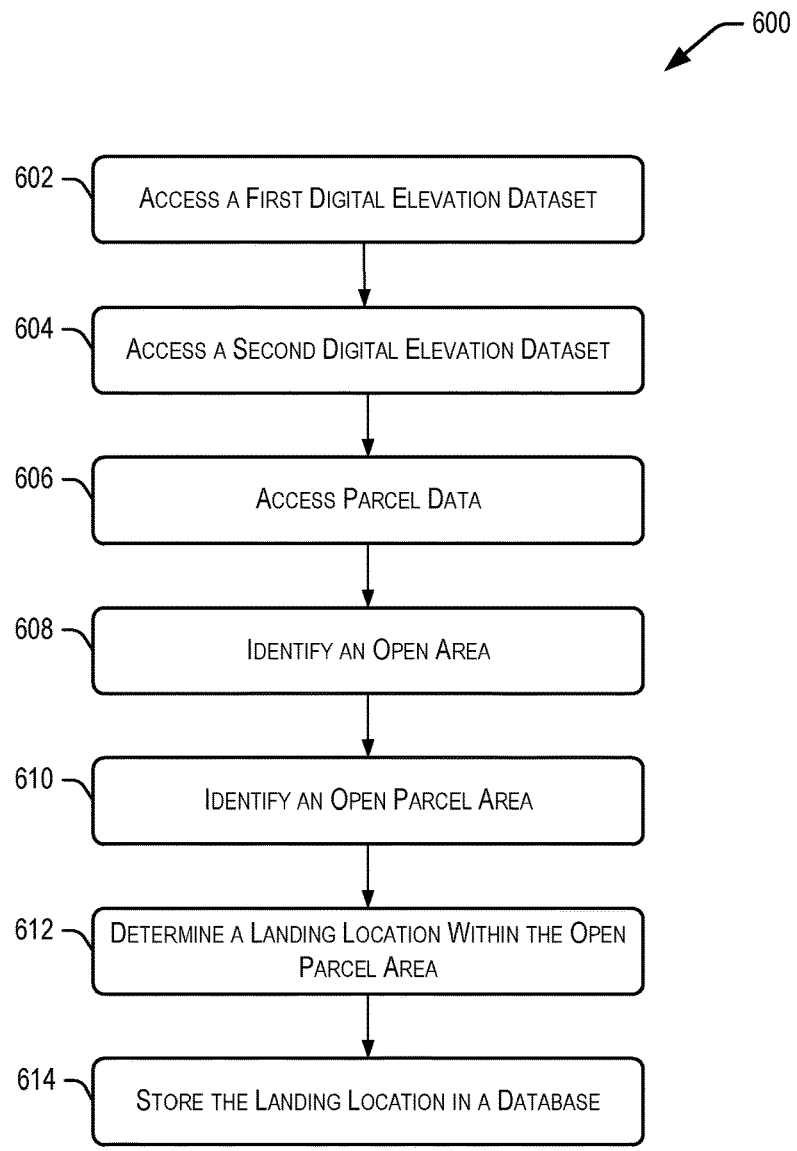
FIG. 6 is a flow diagram depicting example acts for implementing techniques relating to determining landing locations for unmanned aerial vehicles as described herein, according to at least one example.
Figure 7:
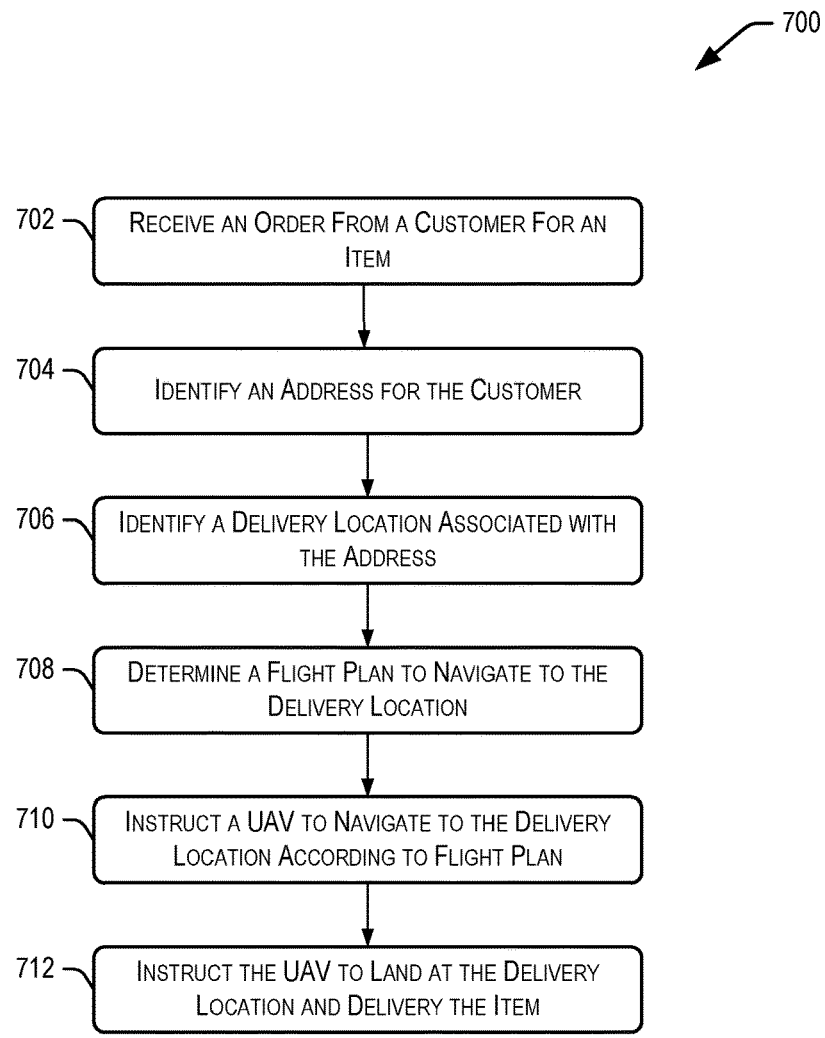
FIG. 7 is a flow diagram depicting example acts for implementing techniques relating to determining landing locations for unmanned aerial vehicles as described herein, according to at least one example.
Figure 8:
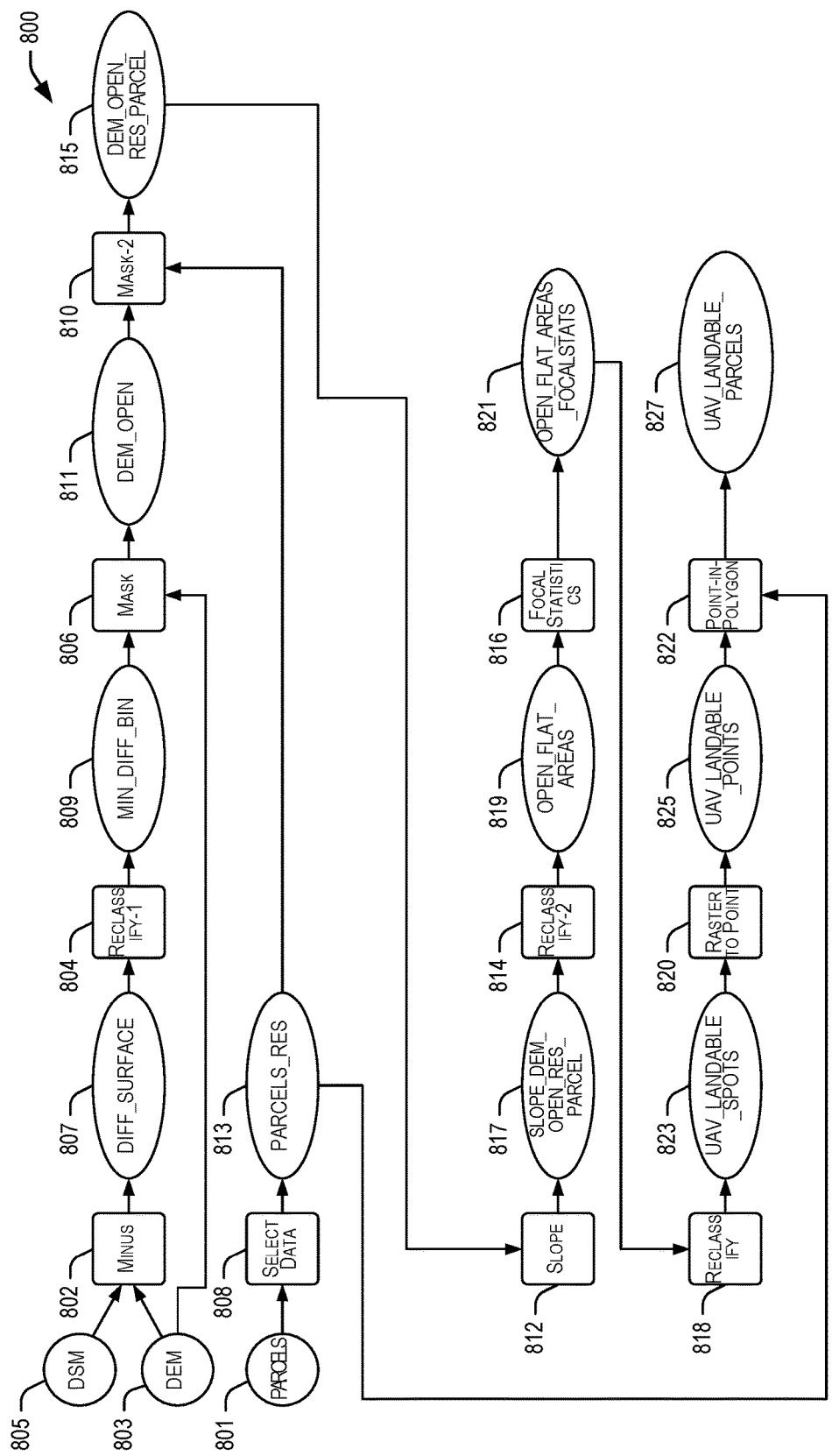
FIG. 8 is a flow diagram depicting example acts for implementing techniques relating to determining landing locations for unmanned aerial vehicles as described herein, according to at least one example.

FIGS. 6, 7, and 8 illustrate example flow diagrams showing respective processes 600, 700, and 800, as described herein. These processes 600, 700, and 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 6 depicts the process 600 including example acts or techniques relating to determining landing locations in accordance with at least one example. The mapping engine 354 (FIG. 3) may perform the process 600 of FIG. 6. The process 600 begins at 602 by accessing a first digital elevation dataset. In some examples, accessing the first digital elevation dataset may be performed by the communication module 402 (FIG. 4). Accessing the first digital elevation dataset may include receiving the first digital elevation dataset from memory. In some examples, the first digital elevation dataset may be a digital surface elevation dataset. In some examples, the first digital elevation dataset may have been collected according to a first collection procedure. In some examples, the first digital elevation dataset may have a first resolution (e.g., each pixel represents 2 meters) and a first margin of error in each of the vertical and horizontal directions. The first digital elevation dataset may correspond to a geographic region (e.g., a neighborhood, a city, a county, or any other region).

At 604, the process 600 accesses a second digital elevation dataset. In some examples, accessing the second digital elevation dataset may be performed by the communication module 402. The second digital elevation dataset may be accessed in a similar manner as the first digital elevation dataset at 602. The second digital elevation dataset may be a digital bare-earth elevation dataset. In some examples, the second digital elevation dataset may have been collected according to a second collection procedure that is different than the first collection procedure. For example, the first collection procedure may be collection via a LiDAR device mounted on an airplane that flies on a first day and the second collection procedure may be collection via a stereo photogrammetry device mounted on a different airplane that flies on the first day. In some examples, it may be desirable that the first digital elevation dataset and the second digital elevation dataset are collected within a similar period of time. In some examples, the second digital elevation dataset may have a resolution similar to the first resolution and a margin of error similar to the first margin of error. The second digital elevation dataset may correspond to the geographic region.

At 606, the process 600 accesses parcel data. In some examples, accessing the parcel data may be performed by the communication module 402. Accessing the parcel data may include accessing the parcel data from memory. In some examples, the parcel data may be received from one or more entities that maintain parcel data. The parcel data may include residential parcels, commercial parcels, private non-residential parcels, public parcels, and any other suitable parcel. The parcel data may correspond to the geographic region.

At 608, the process 600 identifies an open area. In some example, identifying the open area may be performed by the delivery location determination module 404 (FIG. 4). The open area may be an area in the geographic region that has a column of open air directly above (i.e., no obstacles such as trees, power lines, bridges, homes, or any other possible obstacles located above the open area). In some examples, identifying the open area may include comparing the second digital elevation dataset and the first digital elevation dataset. Comparing the second digital elevation dataset and the first digital elevation dataset may include subtracting the second digital elevation dataset from the first digital elevation dataset to determine a differential digital elevation dataset. In some examples, comparing the datasets may include converting the differential digital elevation dataset to a differential binary dataset and identifying the open area based at least in part on the differential binary dataset. This may result in a dataset that indicates areas that are open to the sky. Areas that are minimally similar in elevation (i.e., less than + or −2 feet) may indicate areas that are open to the sky. Areas that are very dissimilar in elevation may indicate areas that are not open to the sky. This may be because large differences in elevation between the two datasets may indicate that there is an obstacle at that location.

At 610, the process 600 identifies an open parcel area. In some examples, identifying the open parcel area may be performed by the delivery location determination module 404. Identifying the open parcel area may include determining the open parcel area based at least in part on the open area determined at 608 and the parcel data accessed at 606. In some examples, the open parcel area may include the area that is open to the sky and that falls within a certain parcel of the parcel data. For example, the parcel data may be used as a mask to eliminate non-residential parcels. Thus, the open parcel area may be an open area within a residential parcel. Such data may be beneficial for identifying a possible landing location for an unmanned aerial vehicle to delivery items to a customer located at a home on the residential parcel. In some examples, the open parcel area may be a non-residential parcel that is open to the sky. For example, the open parcel area may be a public parcel (e.g., a park, a school, or other open area) that could be used as an emergency landing location for the unmanned aerial vehicle.

At 612, the process 600 determines a landing location within the open parcel area. In some examples, determining the landing location within the open parcel area may be performed by the delivery location determination module 404. Determining the landing location within the open parcel area may include determining the landing location based at least in part on a slope calculation. The slope calculation may indicate areas that are not too steep for landing the UAV. The slope calculation may include determining one or more slope values within the open parcel area and identifying, from the one or more slope values, slope values that fall within a slope threshold corresponding to a maximum slope on which the UAV can land. In some examples, the slope calculation may indicate areas based factors other than not being too steep to land the UAV. For example, in the event of an aerial delivery of a parcel by the UAV, the slope calculation may indicate a maximum slope on which the parcel can be placed without rolling. In some examples, determining the landing location within the open parcel area may include determining the landing location based at least in part on an area calculation. The result of the area calculation may identify areas within the open parcel area that fall within an area threshold (e.g., 6 meter diameter) corresponding to a minimum area of ground to accommodate landing the UAV. The minimum area of ground may be determined in a manner that accounts for external forces that may act on the UAV as it lands and other factors to ensure that the area of ground is sufficiently large to enable safe landing of the UAV. The area calculation may include determining one or more areas within the open parcel area that fall within an area threshold. The area threshold may correspond to a minimum area of ground to accommodate landing of the UAV. In some examples, the area threshold may correspond to a minimum area of ground to accommodate receiving a parcel delivered by the UAV without the UAV landing on the ground.

At 614, the process 600 stores the landing location in a database. In some examples, storing the landing location in the database may be performed by the delivery location determination module 404. Storing the landing location in the database may include storing the landing location in a manner accessible by the UAV. For example, the UAV may access the database as part of determining a flight plan to deliver a parcel including an item.

FIG. 7 depicts the process 700 including example acts or techniques relating to instructing a UAV to land at a delivery location in accordance with at least one example. The UAV management engine 304 (FIG. 3) may perform the process 700 of FIG. 7. The process 700 begins at 702 by receiving an order from a customer for an item. In some examples, receiving the order from the customer for the item may be performed by the communication module 502 (FIG. 5). The order may have originated by a customer searching for and identifying an item available in connection with an electronic marketplace. In some examples, the customer is a customer of electronic marketplace and the item will be delivered to the customer via a UAV. In some examples, the order is not associated with an electronic marketplace and may be an order for delivery of an item as described herein.

At 704, the process 700 identifies an address for the customer. In some examples, identifying an address for the customer may be performed by the navigation module 504 (FIG. 5). Identifying an address for the customer may include identifying the address from a database that includes customer information. In some examples, the address may be a physical address where the customer resides. For example, for a residential customer, the address may be the address for the residential customer's home. In some examples, the customer may provide the address as part of check-out transaction on the electronic marketplace. In some examples, identifying the address may include receiving the address from the electronic marketplace.

At 706, the process 700 identifies a delivery location associated with the address. In some examples, identifying the delivery location may be performed by the navigation module 504. Identifying the delivery location may include accessing a database that has been configured by the process 600 or the process 800 and identifying the delivery location based on the address. For example, the process 600 may access a database of delivery locations and look up the delivery location using the address. In some examples, identifying the delivery location at 706 may include performing the process 600 or the process 800 to determine the landing location. In some examples, the delivery location is a location where the UAV may delivery a parcel that includes the item. In some examples, the delivery location is open to the sky, has a suitable area of associated land, and is not too steep.

At 708, the process 700 determines a flight plan to navigate to the delivery location. In some examples, determining the flight plan may be performed by the navigation module 504. Determining the flight plan may include accessing parcel data to determine a route from a beginning point to the delivery location that avoids critical areas. In some examples, the route may include one or more waypoints between the beginning point and the delivery location. The way points may be used by the UAV for navigation purposes. In some examples, the critical areas may be areas over which the UAV flight is restricted or avoids. In some examples, determination of the critical areas may include a time dimension. For example, a play field at a school may be critical area during week days, but on weekends, the play field may not be a critical area. In some examples, the play field may even be designated an emergency landing location in accordance with techniques described herein.

At 710, the process 700 instructs the UAV to navigate to the delivery location according to the flight plan. In some examples, instructing the UAV to navigate may be performed by the navigation module 504. Instructing the UAV to navigate may include generating one or more instructions as part determining the flight plan and providing the one or more instructions to the UAV.

At 712, the process 700 instructs the UAV to land at the delivery location and delivery the item. In some examples, instructing the UAV to land at the delivery location and delivery the item may be performed by the delivery module 506 (FIG. 5). Instructing the UAV to land may include instructing the UAV to descend to the ground within an area defined by the landing location. Instructing the UAV to deliver the item may include instructing the UAV to release a parcel that includes the item while on the ground.

Figure 9:
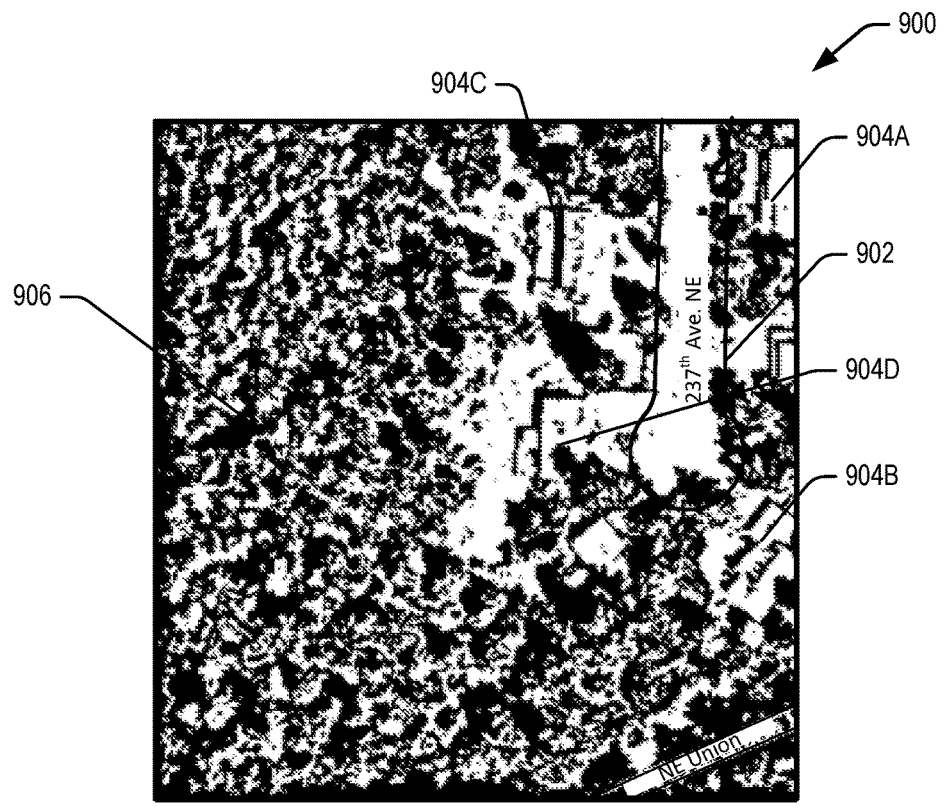
FIGS. 9-21 are example datasets generated at various stages of the flow diagram illustrated in FIG. 8 that depicts example acts for implementing techniques relating to determining landing locations for unmanned aerial vehicles as described herein, according to at least one example.

FIG. 8 depicts process 800 including example acts or techniques relating to determining landing locations in accordance with at least one example. The mapping engine 354 (FIG. 3) may perform the process 800 of FIG. 8. In some examples, the mapping engine 354 may execute in a geographic information systems (GIS) mapping execution environment. The process 800 may take as input three different data elements: a digital surface model 805, a digital elevation model 803, and county parcel data 801. In some examples, the digital surface model 805, the digital elevation model 803, and the county parcel data 801 may correspond to a geographic region. For purposes of explanation, the digital surface model 805, the digital elevation model 803, and the county parcel data 801 may correspond to a neighborhood 900 illustrated in FIG. 9. The neighborhood 900 may include a cul-de-sac 902 (237$^{th}$ Ave. NE) including homes 904A-904D. The cul-de-sac 902 may correspond to a non-residential public parcel and each of the homes the 904A-904D may correspond to a residential private parcel. Behind the homes 904C, 904D may be situated a grove of trees 906, which may be a non-residential public parcel.

Figure 10:
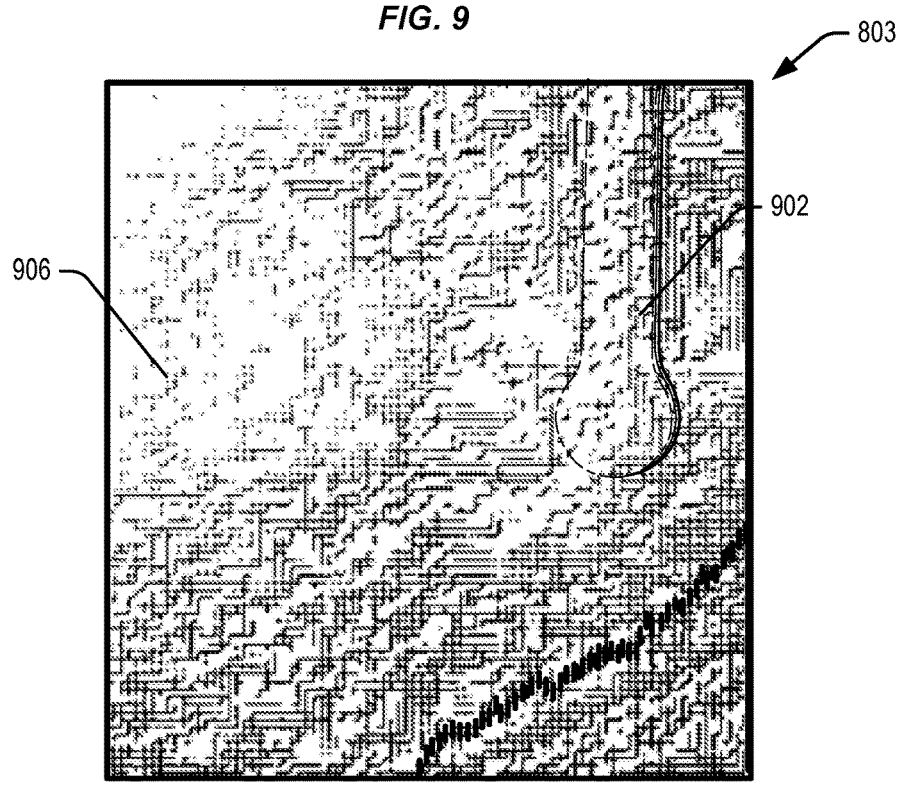
Figure 11:
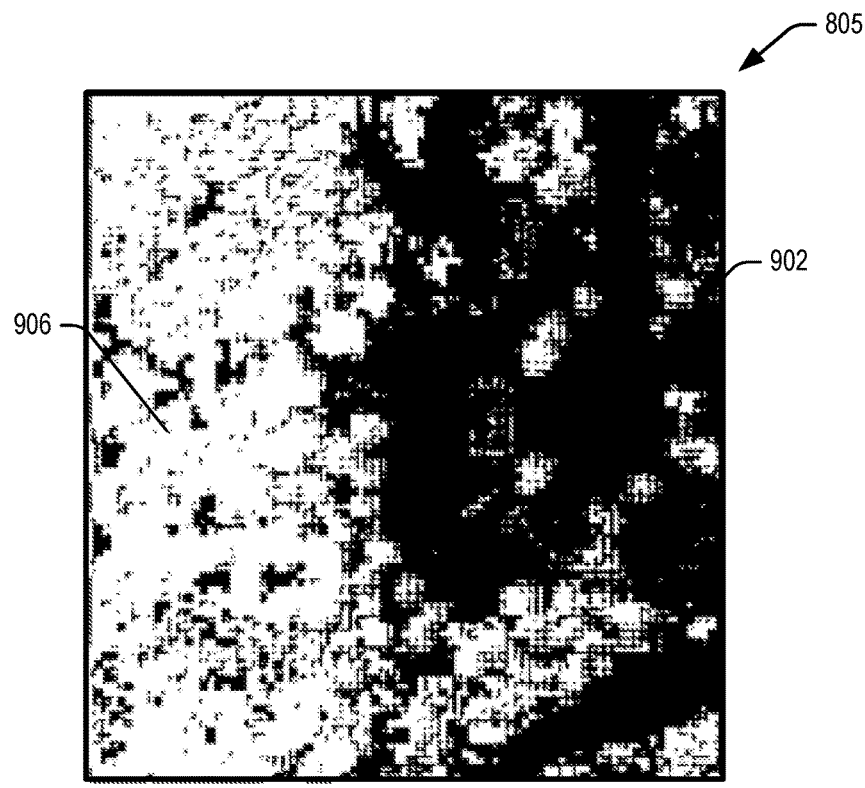

A graphical illustration of the digital elevation model 803 is illustrated in FIG. 10. As illustrated in FIG. 10, the digital elevation model 803 may show values of high elevation in lighter shading and values of lower elevation in darker shading. Because the digital elevation model 803 may be a bare earth model, the elevation across the digital elevation model 803 may be relatively uniform. A graphical illustration of the digital surface model 805 is illustrated in FIG. 11. As illustrated in FIG. 11, the digital surface model 805 may show values of high elevation in white and values of lower elevation in darker shades. For example, because the digital surface model 805 may be a digital surface elevation dataset, the elevation of the tops of trees in the grove of trees 906 are depicted as having higher elevation values compared to the cul-de-sac 902, which is depicted by almost black shading. In this manner, the digital surface model 85 may depict the different relative elevations.

As discussed herein, the digital surface model 805 and the digital elevation model 803 may be captured on two separate days by two different sensors (e.g., from aerial platforms—i.e. airplane mounted sensors). This may be desirable because if two different sensors find that the areas on the ground are coincidentally similar in elevation, they are not only open to the sky (because the airplane-mounted sensor detected it), but also that there are no obstacles in those areas.

Figure 12:
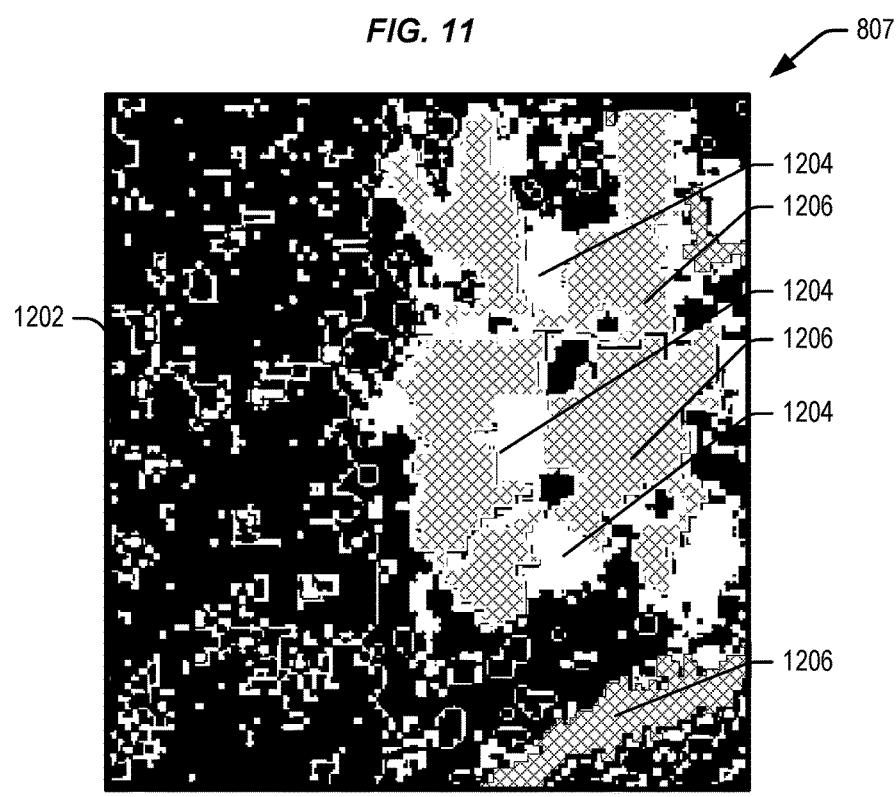

The process 800 begins at 802 by subtracting the digital elevation model 803 from the digital surface model 805. In some examples, this may be performed by the delivery location determination module 404 (FIG. 4). This may result in a differential surface 807. A graphical illustration of the differential surface 807 is illustrated in FIG. 12. The values in the differential surface 807 which are similar (e.g., within 2 feet of elevation) are assumed to be the areas of ground that are open to the sky. This may be because areas of greater elevation difference in the differential surface 807 are those areas where obstacles are present. For example, an elevation difference of over 100 feet may indicate the presence of tall trees (illustrated by dark areas 1202, some of which correspond to the grove of trees 906), an elevation difference between 30 feet and 100 feet may indicate moderately tall trees, an elevation difference between 5 feet and 30 feet may indicate homes or other structures (illustrated by white areas 1204, some of which may correspond to the homes 904A-904D), an elevation difference between 2 feet and 5 feet may indicate a mix of small vegetation and yard items, and an elevation difference less than 2 feet may indicate areas of ground that are open to the sky (illustrated by thatched areas 1206, some of which may correspond to yards of the homes 904A-904D and the cul-de-sac 902). The differential surface 807 may be a digital elevation model of continuous differential values.

Figure 13:
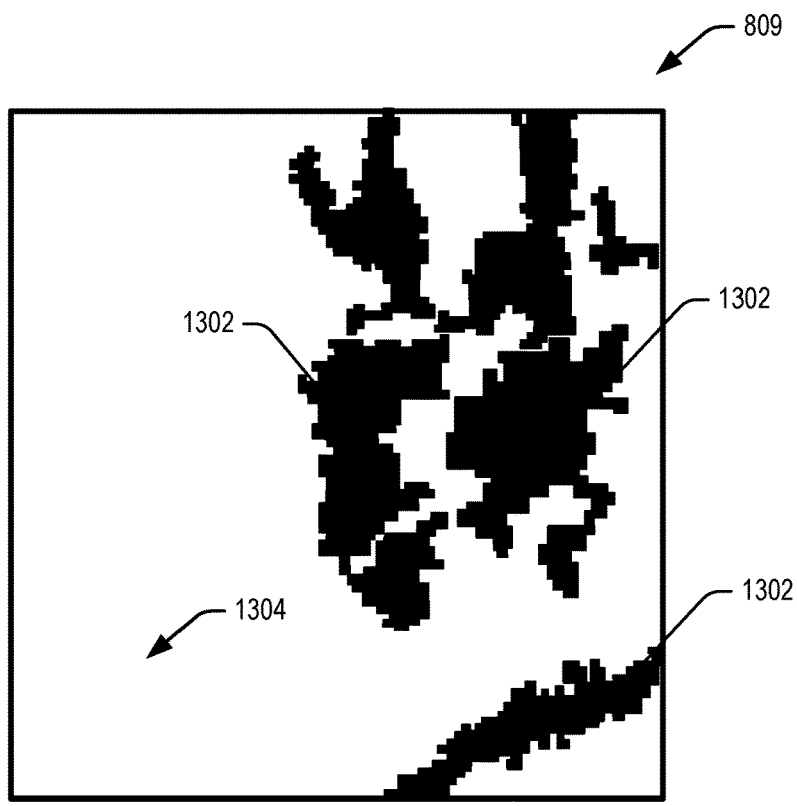

At 804, the process 800 reclassifies the differential surface 807 to create a binary minimum difference image 809. In some examples, this may be performed by the delivery location determination module 404. A graphical illustration of the binary minimum difference image 809 is illustrated in FIG. 13. The binary minimum difference image 809 may include a set of selected pixels of value 1 (illustrated by dark areas 1302) which may correspond to the thatched areas 1206, i.e., areas that are open to the sky. The remaining pixels corresponding to the remaining areas of the binary minimum difference image 809 may be given a NoData value, i.e., a conceptual pixel value which causes subsequent processing of those pixels to be nullified. In the binary minimum difference image 809, the NoData values correspond to whitespace 1304.

Figure 14:
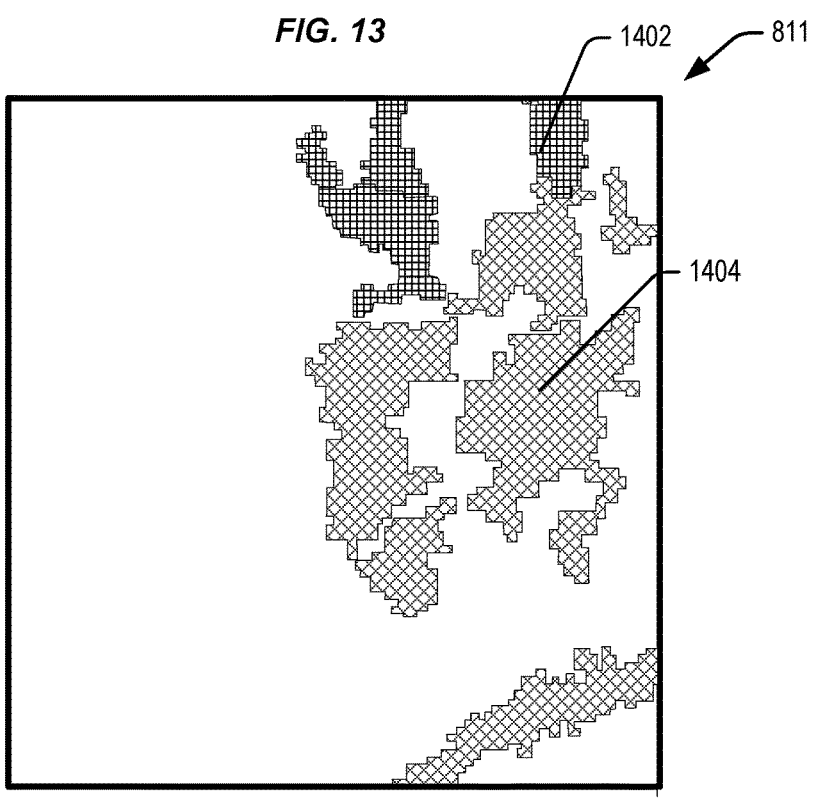

At 806, the process 800 accesses the binary minimum difference image 809 and uses the binary minimum difference image 809 as an analysis mask to remove elevation data corresponding to the whitespace 1304 from the digital elevation model 803. In some examples, this may be performed by the delivery location determination module 404. This analysis may result in the creation of an open digital elevation model 811. A graphical illustration of the open digital elevation model 811 is illustrated in FIG. 14. The open digital elevation model 811 may include first elevation data 1402 and second digital elevation data 1404 from the digital elevation model 803 that is open to the sky, i.e., free of obstacles. In some examples, this may be referred to as open areas.

Figure 15:
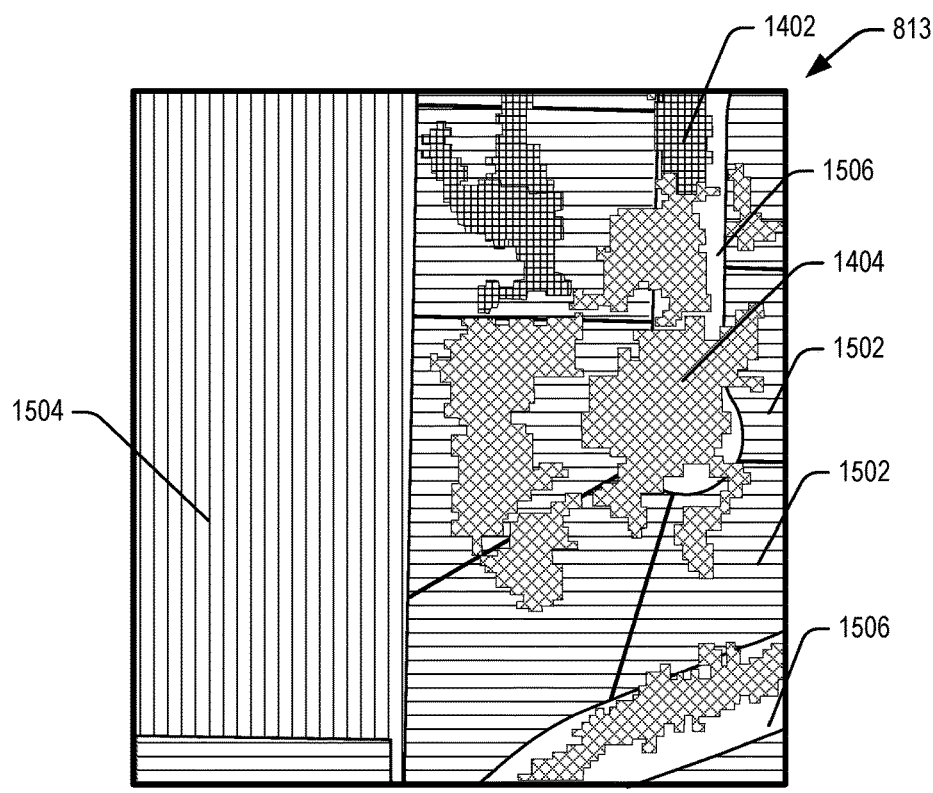

At 808, the process 800 accesses the county parcel data 801 and selects residential parcels 813 from the county parcel data 801 to overlay the open digital elevation model 811. In some examples, this may be performed by the delivery location determination module 404. A graphical illustration of the residential parcels 813 is illustrated in FIG. 15. Thus, in this example, the residential parcels 813 may be selected by selecting the appropriate zoning distinctions (e.g., R1 through R8 zoning name) or by any other suitable operation. In some examples, other types of parcels may be used for purposes herein. For example, open public areas may be selected for determining staging areas for UAVs and/or emergency landing locations for UAVs. In any event, the residential parcels 813 may include residential parcels 1502, forest parcel 1504, and road parcels 1506. The residential parcels 813 may also include the first elevation data 1402 and the second digital elevation data 1404.

Figure 16:
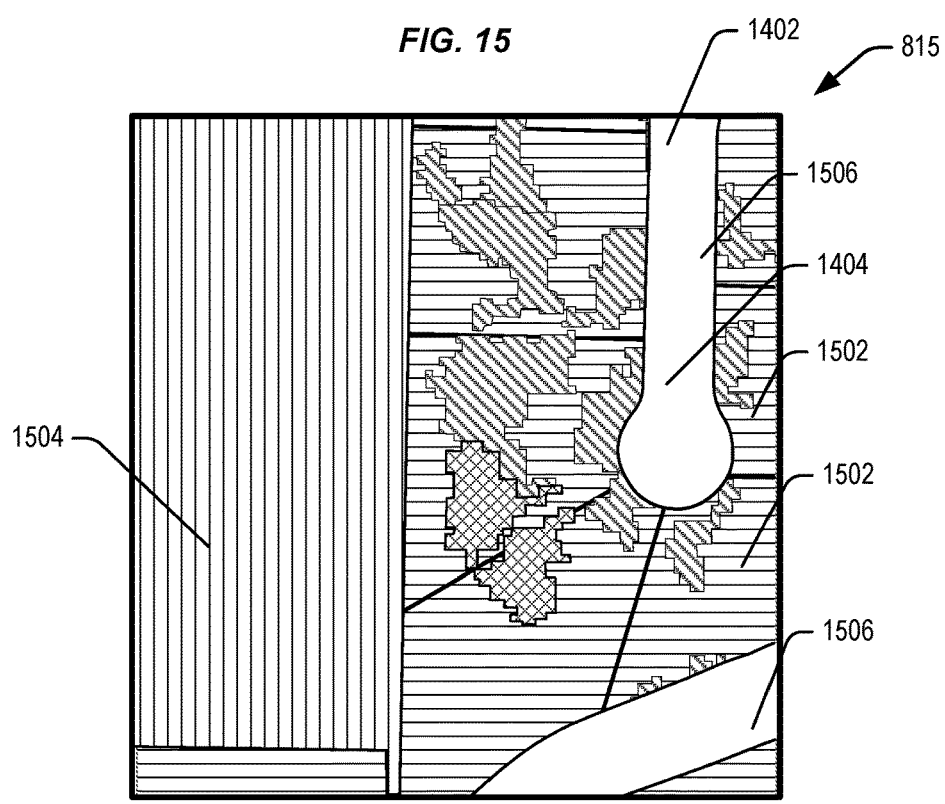

At 810, the process 800 accesses the residential parcels 813 and uses the residential parcels 813 as an analysis mask to exclude all non-residential parcels from the dataset. In some examples, this may be performed by the delivery location determination module 404. This analysis may result in an open residential digital elevation dataset 815. A graphical illustration of the open residential digital elevation dataset 815 is illustrated in FIG. 16. In this example, digital elevation data that corresponds to the non-residential parcels may be excluded from the dataset. Thus, as illustrated in FIG. 16, the road parcels 1506 and the forest parcel 1504, both non-residential, have no digital elevation data. The digital elevation data (i.e., the first elevation data 1402 and the second digital elevation data 140) remains in the residential parcels 1502.

Figure 17:
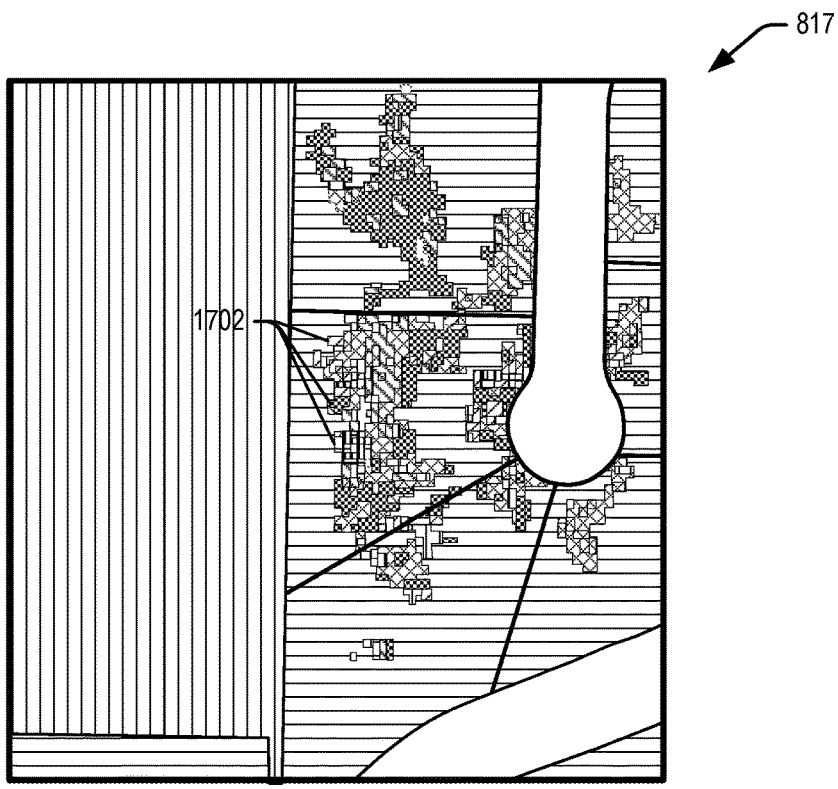

At 812, the process 800 accesses the open residential digital elevation dataset 815 and performs a slope calculation on the open residential digital elevation dataset 815. In some examples, this may be performed by the delivery location determination module 404. Performance of the slope calculation may result in generation of an open slope residential digital elevation dataset 817. A graphical illustration of the open slope residential digital elevation dataset 817 is illustrated in FIG. 17. In some examples, the slope calculation may determine the slope of the ground within the elevation data that corresponds to the open residential digital elevation dataset 815. The slope calculation may reveal the degree of slope present in each of the areas of the open residential digital elevation dataset 815. Slope results 1702 of the slope calculation may be presented in the open slope residential digital elevation dataset 817. The slope results 1702 may be presented as a range of different slopes. Thus, the slope results 1702 may include a variety of different patterns or colors that may correspond to the different slope values across the digital elevation dataset. In some examples, the slope values may correspond to percentage slope, grade, or any other suitable slope indicator.

Figure 18:
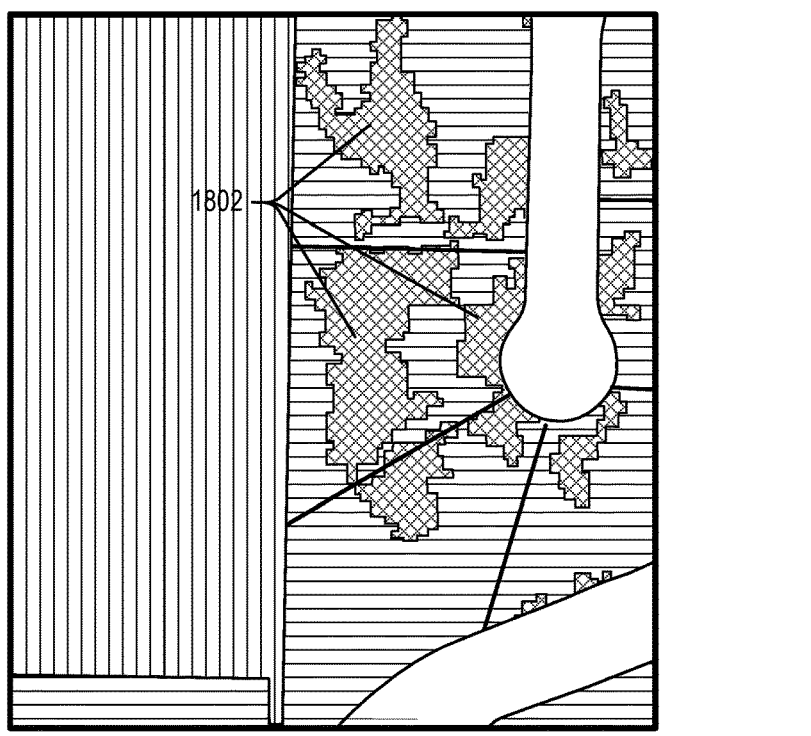

At 814, the process 800 accesses the open slope residential digital elevation dataset 817 and continues the slope calculation by creating an open flat areas dataset 819. In some examples, this may be performed by the delivery location determination module 404. A graphical illustration of the open flat areas dataset 819 is illustrated in FIG. 18. In some examples, the open flat areas dataset 819 may be a binary map that includes flat areas 1802, i.e., areas of land that have area values that fall within some threshold. For example, the flat areas 1802 may be areas of land that have slopes less than or equal to 10%. In some examples, 10% slope may correspond to the maximum slope on which a UAV may land. In some examples, the UAV may be configured to land on much steeper slopes, and thus, the threshold may be greater than 10%.

Figure 19:
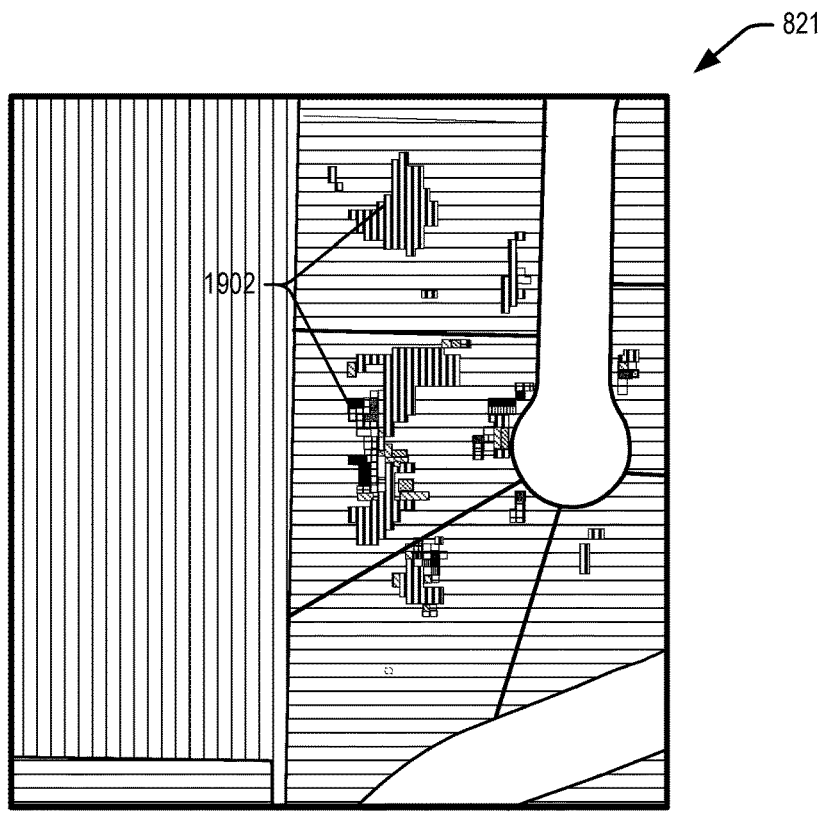

At 816, the process 800 accesses the open flat areas dataset 819 and performs an area calculation. In some examples, this may be performed by the delivery location determination module 404. Performance of the area calculation may result in generation of an open flat areas neighborhood dataset 821. A graphical illustration of the open flat areas neighborhood dataset 821 is illustrated in FIG. 19. In some examples, the open flat areas neighborhood dataset 821 may be an image with values of 1 and NoData. In some examples, the datasets described herein may have a resolution of 2 meters, i.e., every pixel represents 2 meters. It may be determined that in order to safely land a UAV, an area of about 6 meters should be selected. This may give the UAV a reasonable amount of open space to account for the many environmental hazards it will encounter (i.e. getting pushed around by the wind), and to allow for maneuvering in its self-discovery of what it is landing near. Thus, because the pixel resolution is 2 meters, a 3×3 set of pixels grouped together would equal the desired 6 meters. In some examples, the area calculation may include using a Focal-Stats operation to calculate, for each pixel with a value, the sum of pixels in a specified neighborhood. This may enable a summation of the pixel values wherever digital elevation data remains (e.g., within graphical representations 902 of the digital elevation data). Because some of the neighborhoods may not be large enough to fit a 3×3 set, the open flat areas neighborhood dataset 821 may include different graphical representations 1902 to correspond to area values of 1 pixel to 9 pixels.

Figure 20:
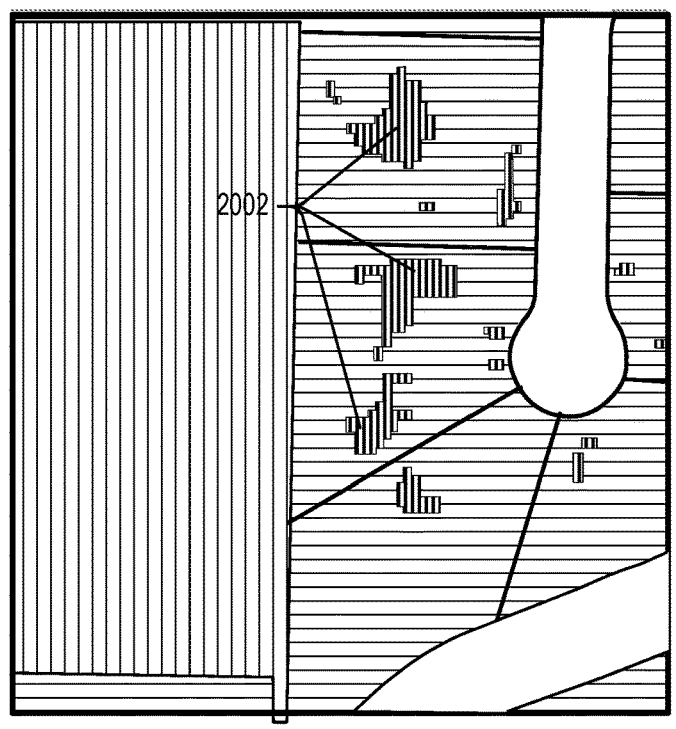

At 818, the process 800 continues the area calculation to select pixels from the open flat areas neighborhood dataset 821 that are equal to the value 9, i.e., are large enough to sum a 3×3 pixel area which corresponds to a 6 meter square or a circle with a 6 meter diameter. In some examples, this may be performed by the delivery location determination module 404. Performance of the area calculation on the open flat areas neighborhood dataset 821 may result in a generation of UAV a "landable spots" dataset 823. A graphical illustration of the UAV landable spots dataset 823 is illustrated in FIG. 20. The UAV landable spots dataset 823 may include one or more landable spots 2002 where a UAV would have sufficient area to land. Thus, the UAV landable spots dataset 823 may exclude areas less than 3×3 pixels. In some examples, the one or more landable spots 2002 may correspond to one or more landing locations or delivery locations determined in accordance with techniques described herein.

Figure 21:
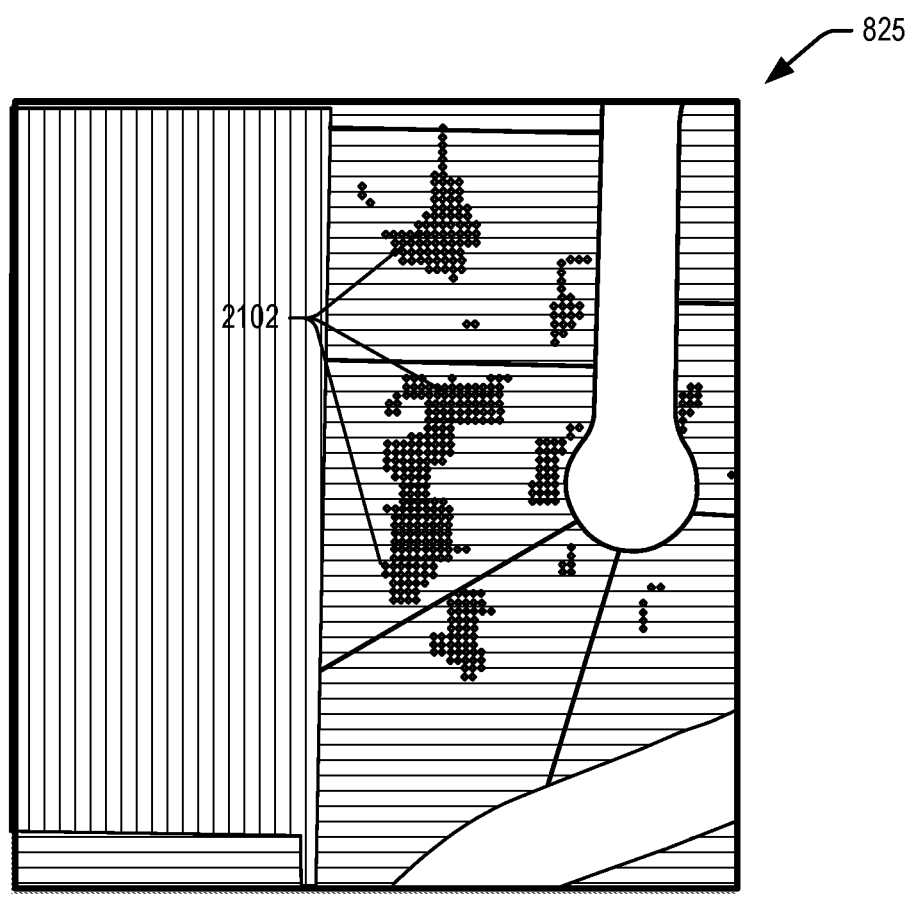

At 820, the process 800 may convert the UAV landable spots dataset 823 from an image format to a vector/point format to generate UAV landable points dataset 825. In some examples, this may be performed by the delivery location determination module 404. A graphical illustration of the UAV landable points dataset 825 is illustrated in FIG. 21 the UAV landable points dataset 825 may include one or more UAV landable points 2102. In some examples, the one or more UAV landable points 2102 may correspond to one or more landing locations or delivery locations determined in accordance with techniques described herein.

At 822, the process 800 may associate the UAV landable points dataset 825 with selected parcels of the county parcel data 801 to generate a UAV landable parcels dataset 827. In some examples, this may be performed by the delivery location determination module 404. The UAV landable parcels dataset 827 may be used to identify UAV landing locations within residential parcels and perform other operations related to determining UAV landing locations. For example, landability metrics (i.e., what percentage of residential parcels are landable by a UAV, per county, city, and any other region) may be derived for the geographic region and corresponds to the digital surface model 805, the digital elevation model 803, and the county parcel data 801. In some examples, certain spots may be identified as alternate destination landing locations or emergency landing locations.

Figure 22:
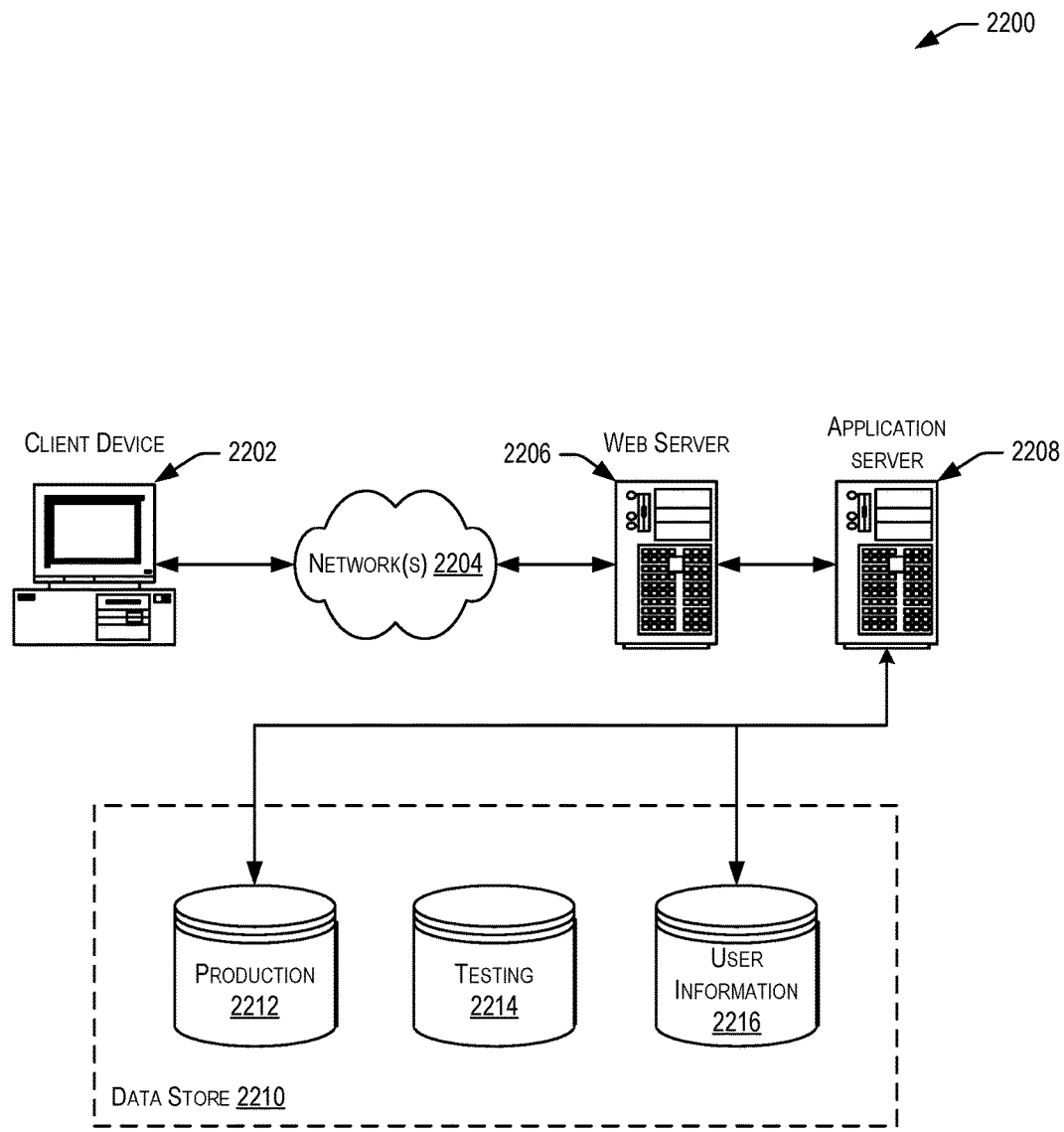
FIG. 22 is an example schematic environment for implementing techniques relating to determining landing locations for unmanned aerial vehicles as described herein, according to at least one example.

FIG. 22 illustrates aspects of an example environment 2200 for implementing aspects in accordance with various embodiments. As will be appreciated, although a Web-based environment is used for purposes of explanation, different environments may be used, as appropriate, to implement various embodiments. The environment includes an electronic client device 2202, which can include any appropriate device operable to send and receive requests, messages, or information over an appropriate network 2204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2206 for receiving requests and serving content in response thereto, although for other networks an alternative device serving a similar purpose could be used as would be apparent to one of ordinary skill in the art.

The illustrative environment includes at least one application server 2208 and a data store 2210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2202 and the application server 2208, can be handled by the Web server. It should be understood that the Web and application servers are not required and are merely example components, as structured code discussed herein can be executed on any appropriate device or host machine as discussed elsewhere herein.

The data store 2210 can include several separate data tables, databases or other data storage mechanisms and media for storing data relating to a particular aspect. For example, the data store illustrated includes mechanisms for storing production data 2212 and user information 2216, which can be used to serve content for the production side. The data store also is shown to include a mechanism for storing log data 2214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2210. The data store 2210 is operable, through logic associated therewith, to receive instructions from the application server 2208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 2202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the environment 2200 in FIG. 22 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
an aerial vehicle configured to deliver a payload to one of a plurality of delivery locations; and
a delivery management service configured with at least a non-transitory memory and a processor configured to:
access a first digital elevation dataset corresponding to a geographic region and collected according to a first collection procedure using a first collection device;
access a second digital elevation dataset corresponding to the geographic region and collected according to a second collection procedure using the first collection device or a second collection device, the second collection procedure being distinct from the first collection procedure;
determine a delivery location for the aerial vehicle by at least comparing the second digital elevation dataset with the first digital elevation dataset to identify an open area within the geographic region, first elevation values of the first digital elevation dataset in the open area and second elevation values of the second elevation dataset in the open area being within a threshold of similarity; and
provide the delivery location to the aerial vehicle.

2. The system of claim 1, wherein the first collection procedure comprises collecting the first digital elevation dataset via a first flight and the second collection procedure comprises collecting the second digital elevation dataset via a second flight.

3. The system of claim 1, wherein the second collection procedure is distinct from the first collection procedure based at least in part on a type of collection device used for collection, an elevation of the collection device used for collection, an operator of the collection device, or software used to process data collected by the collection device.

4. The system of claim 1, wherein the delivery location comprises a patch of land within the geographic region, the patch of land comprising an unobstructed column of airspace extending upwards, an area value meeting or exceeding an area threshold, and no slope value exceeding a slope threshold.

5. The system of claim 1, wherein the geographic region corresponds to at least one of a city, a county, a district, a street, or a neighborhood.

6. A computer-implemented method, comprising:
accessing a first digital elevation dataset collected according to a first collection procedure using a first collection device and a second digital elevation dataset collected according to a second collection procedure using the first collection device or a second collection device, each of the first digital elevation dataset and the second digital elevation dataset corresponding to a geographic region; the first collection procedure is distinct from the second collection procedure;
determining a landing location for an aerial vehicle within the geographic region by at least comparing the first digital elevation dataset with the second digital elevation dataset, first elevation values of the first digital elevation dataset at the landing location and second elevation values of the second elevation dataset at the landing location being within a threshold of similarity, differential elevation values exceeding the threshold of similarity being indicative of one or more obstacles present at the landing location;
storing the landing location in a database; and
providing information about the landing location to the aerial vehicle.

7. The computer-implemented method of claim 6, wherein comparing the first digital elevation dataset with the second digital elevation dataset comprises:
subtracting the first digital elevation dataset from the second digital elevation dataset to identify a differential digital elevation dataset;
converting the differential digital elevation dataset to a differential binary dataset; and
determining the landing location based at least in part on the differential binary dataset, the landing location being open to the sky and free of obstacles.

8. The computer-implemented method of claim 6, further comprising accessing parcel data corresponding to the geographic region, and wherein determining the landing location is based at least in part on the parcel data.

9. The computer-implemented method of claim 6, further comprising:
determining one or more slope values of an area of land within the geographic region; and
identifying, from the one or more slope values, slope values that fall within a slope threshold corresponding to a maximum slope on which the aerial vehicle can land, and wherein determining the landing location is based at least in part on the identified slope values.

10. The computer-implemented method of claim 6, wherein comparing the first digital elevation dataset with the second digital elevation dataset determines one or more areas within the geographic region that fall within an area threshold, the area threshold corresponding to a minimum area of ground to accommodate landing of the aerial vehicle.

11. The computer-implemented method of claim 6, wherein the geographic region is divided into parcels comprising a residential parcel on which a home is located, and wherein the landing location is within a front yard relative to the home or within a back yard relative to the home.

12. The computer-implemented method of claim 6, wherein the geographic region is divided into parcels comprising a residential parcel, and the landing location comprising a patch of land within the residential parcel, the patch of land comprising an unobstructed column of airspace extending upwards from the patch of land, an area value meeting or exceeding an area threshold, and no slope value exceeding a slope threshold.

13. The computer-implemented method of claim 6, wherein the first digital elevation dataset and the second digital elevation dataset have about equal resolution and about equal margins of error, and wherein the first digital elevation dataset and the second digital elevation dataset are each collected within a first time period.

14. The computer-implemented method of claim 6; wherein the landing location comprises an emergency landing location for landing the aerial vehicle in case of an emergency.

15. The computer-implemented method of claim 6, wherein the second collection procedure is distinct from the first collection procedure based at least in part on a type of collection device used for collection, an elevation of the collection device used for collection, an operator of the collection device, or software used to process data collected by the collection device.

16. One or more computer-readable storage devices for storing computer-executable instructions that, when executed by one or more computer systems, configure the one or more computer systems to perform operations comprising:

accessing a first digital elevation dataset corresponding to a geographic region and collected according to a first collection procedure using a first collection device;

accessing a second digital elevation dataset corresponding to the geographic region and collected according to a second collection procedure using the first collection device or a second collection device, the second collection procedure being distinct from the first collection procedure;

identifying one or more positions in the geographic region at which elevation values of the first digital elevation dataset and the second digital elevation dataset are within some threshold of similarity;

determining at least one possible delivery location for an aerial vehicle based on the identified one or more positions; and enabling the aerial vehicle to access information about the at least one possible delivery location.

17. The one or more computer-readable storage devices of claim 16, wherein the at least one possible delivery location is stored in a database accessible by the aerial vehicle.

18. The one or more computer-readable storage devices of claim 16, wherein the one or more computer-readable storage devices are executed by the one or more computer systems within a geographic information system (MS) mapping execution environment.

19. The one or more computer-readable storage devices of claim 16, wherein the at least one possible delivery location comprises a patch of land within the geographic region, the patch of land comprising an unobstructed column of airspace extending upwards, an area value meeting or exceeding an area threshold, and no slope value exceeding a slope threshold.

* * * * *

UNITED STATES PATENT AND TRADEMARK OFFICE
CERTIFICATE OF CORRECTION

PATENT NO. : 10,192,452 B1
APPLICATION NO. : 15/595591
DATED : January 29, 2019
INVENTOR(S) : Jason Douglas Willison It is certified that error appears in the above-identified patent and that said Letters Patent is hereby corrected as shown below:

In the Claims

Column 24, Line 16, Claim 6:
Delete: "region; the first collection procedure is distinct from the"
Insert: --region, the first collection procedure is distinct from the--

Column 25, Line 13, Claim 14:
Delete: "The computer-implemented method of claim 6;"
Insert: --The computer-implemented method of claim 6,--

Column 26, Lines 22-23, Claim 18:
Delete: "systems within a geographic information system (MS) mapping execution environment."
Insert: --systems within a geographic information system (GIS) mapping execution environment.--

Signed and Sealed this
Sixth Day of August, 2019

Andrei Iancu
*Director of the United States Patent and Trademark Office*